June 5, 1945.  A. W. MILLS ET AL  2,377,801
PUNCHING APPARATUS
Filed Dec. 23, 1943   11 Sheets-Sheet 2
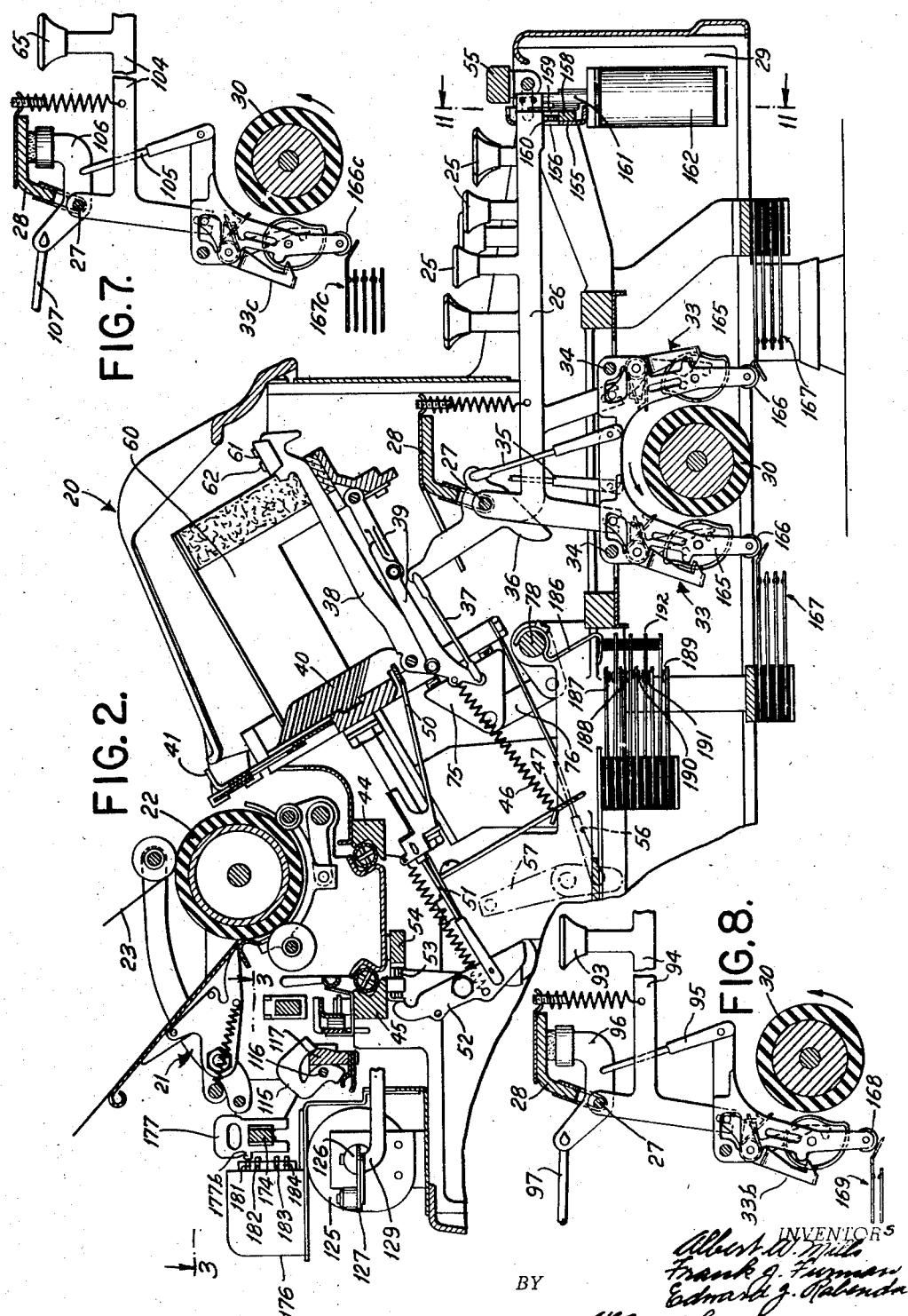
INVENTORS
Albert W. Mills
Frank J. Furman
Edward J. Kalenda
BY
W. M. Wilson  ATTORNEY

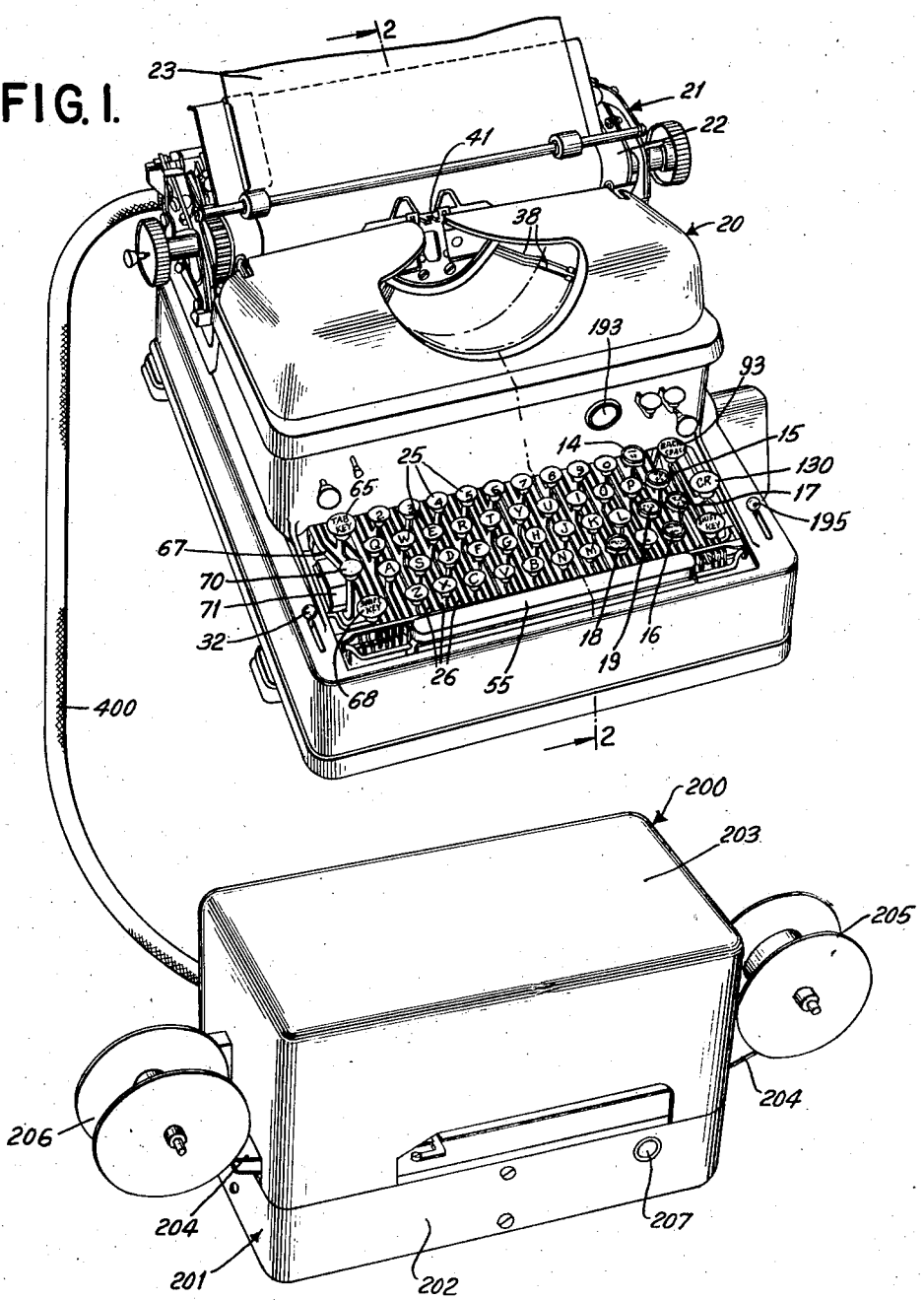

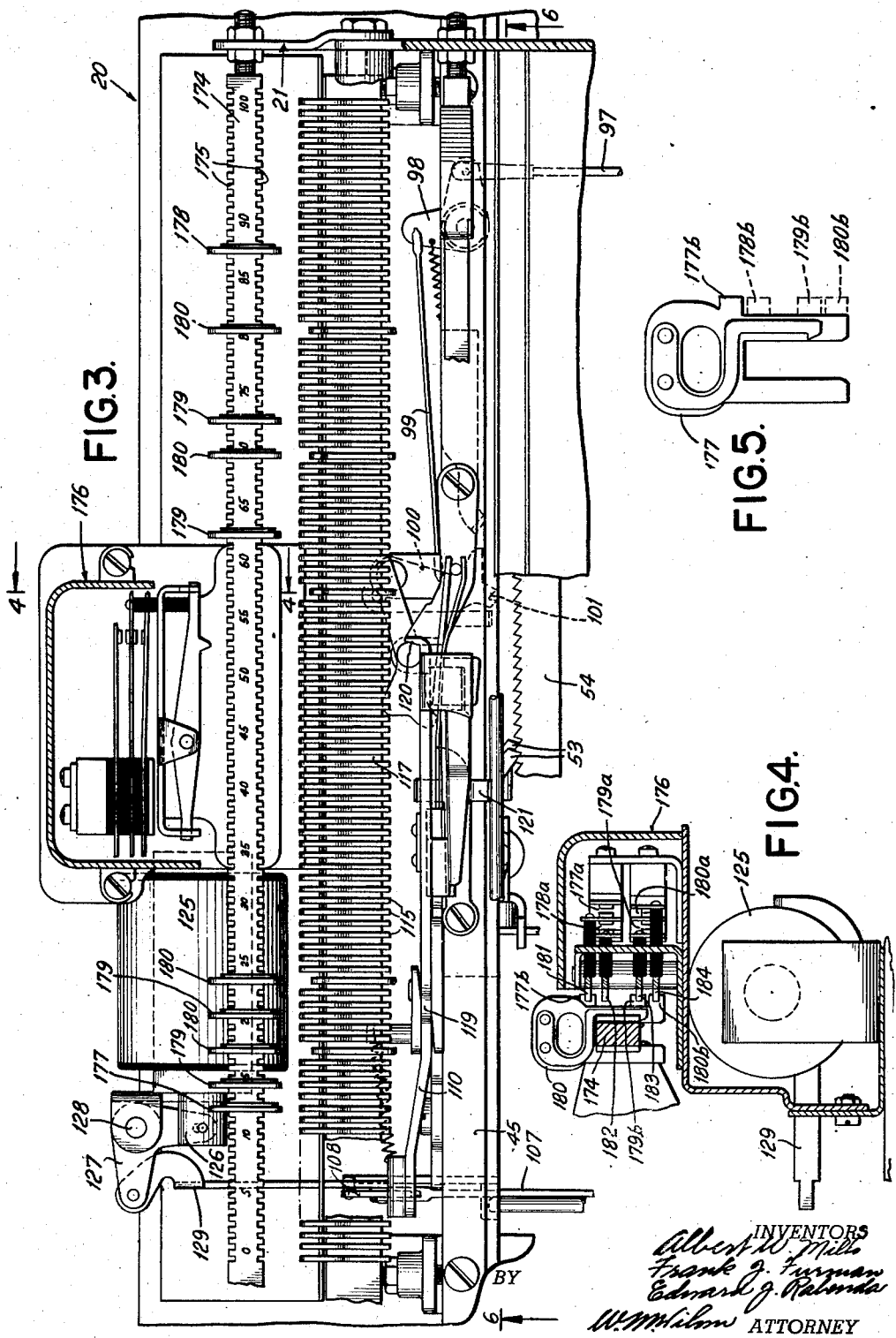

June 5, 1945.  A. W. MILLS ET AL  2,377,801
PUNCHING APPARATUS
Filed Dec. 23, 1943  11 Sheets-Sheet 4
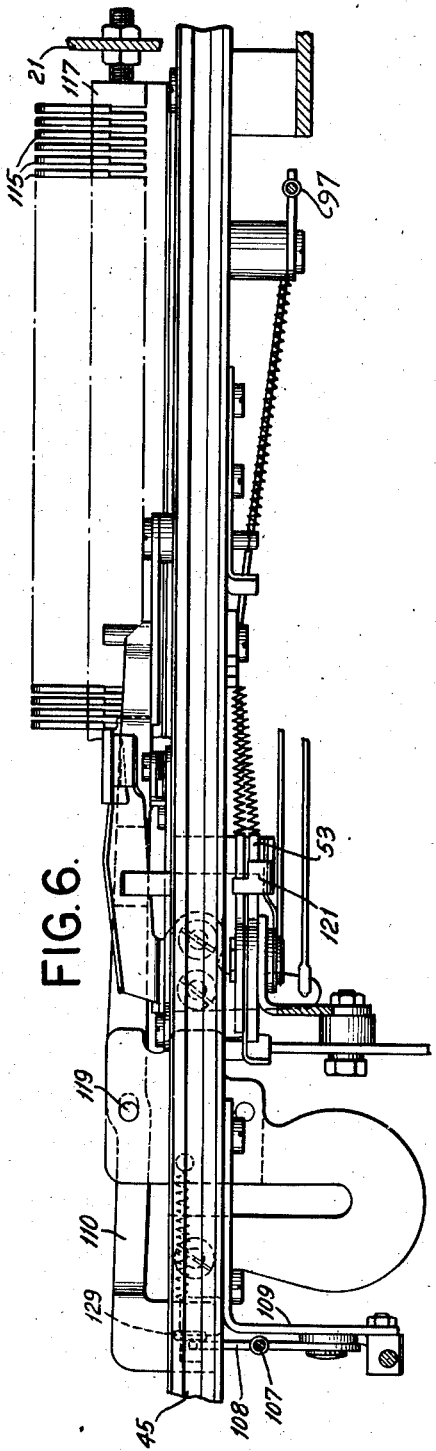
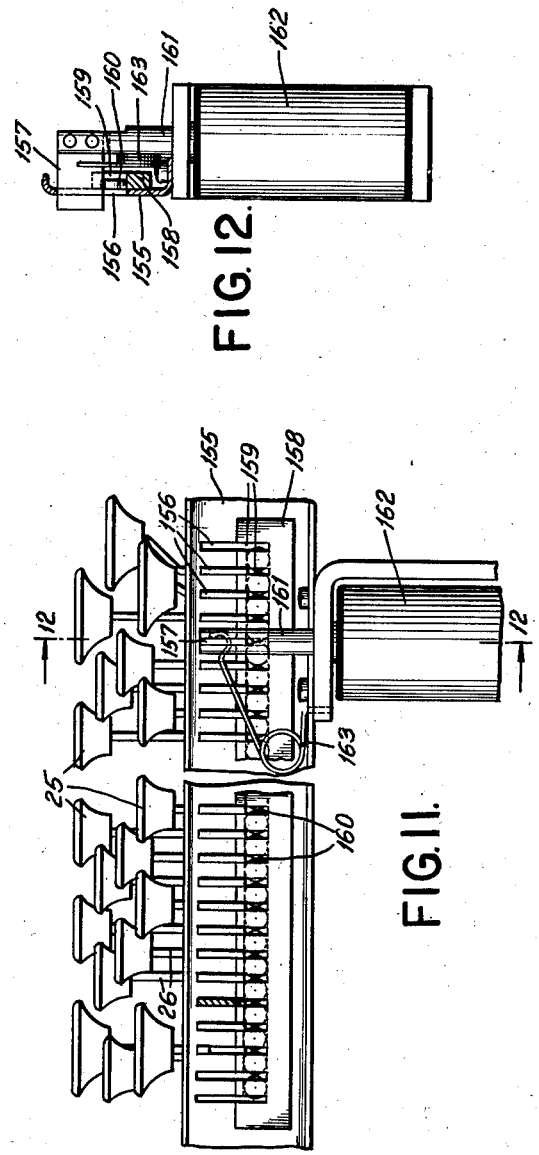

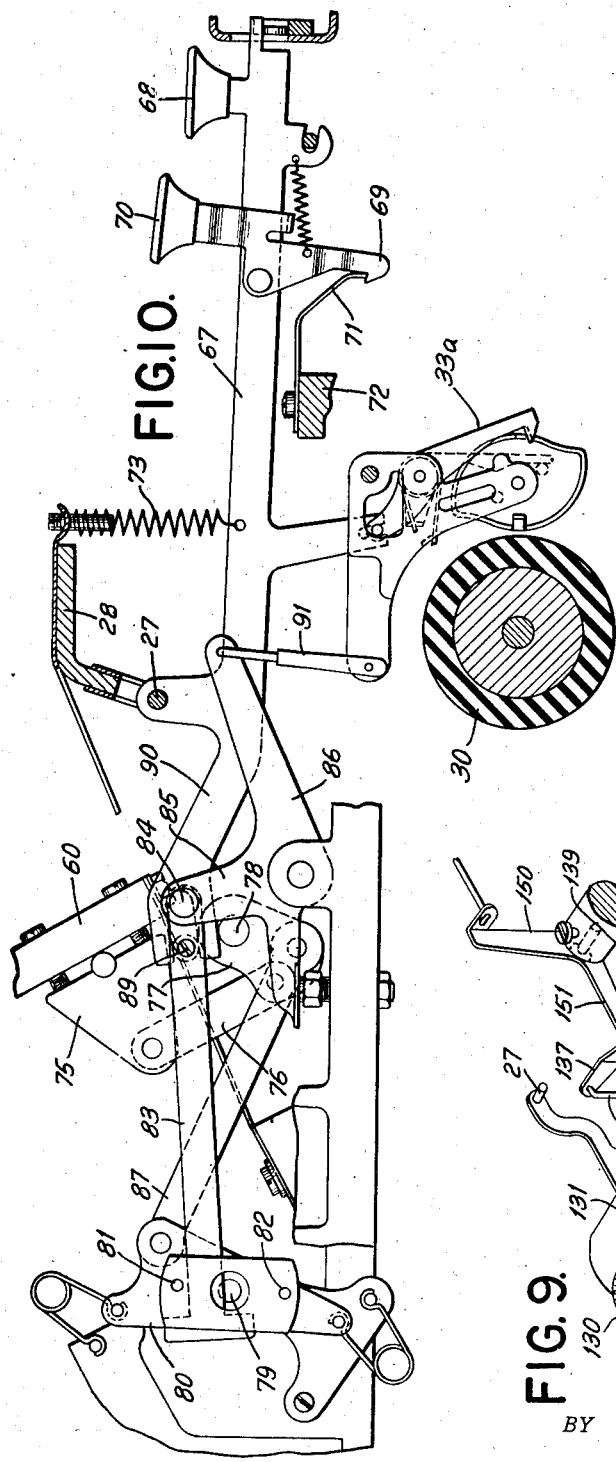
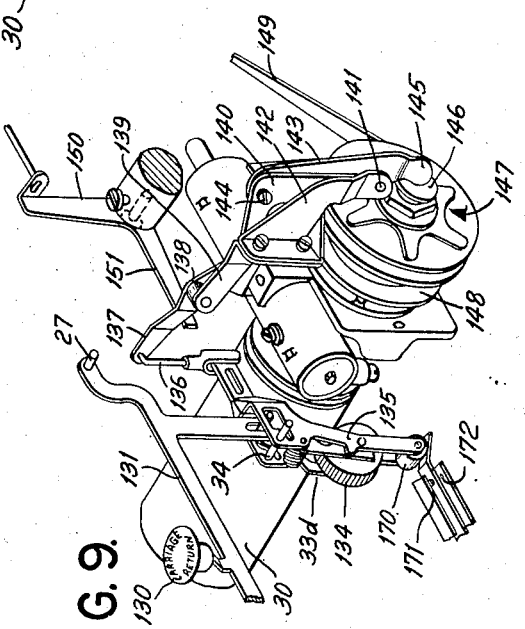

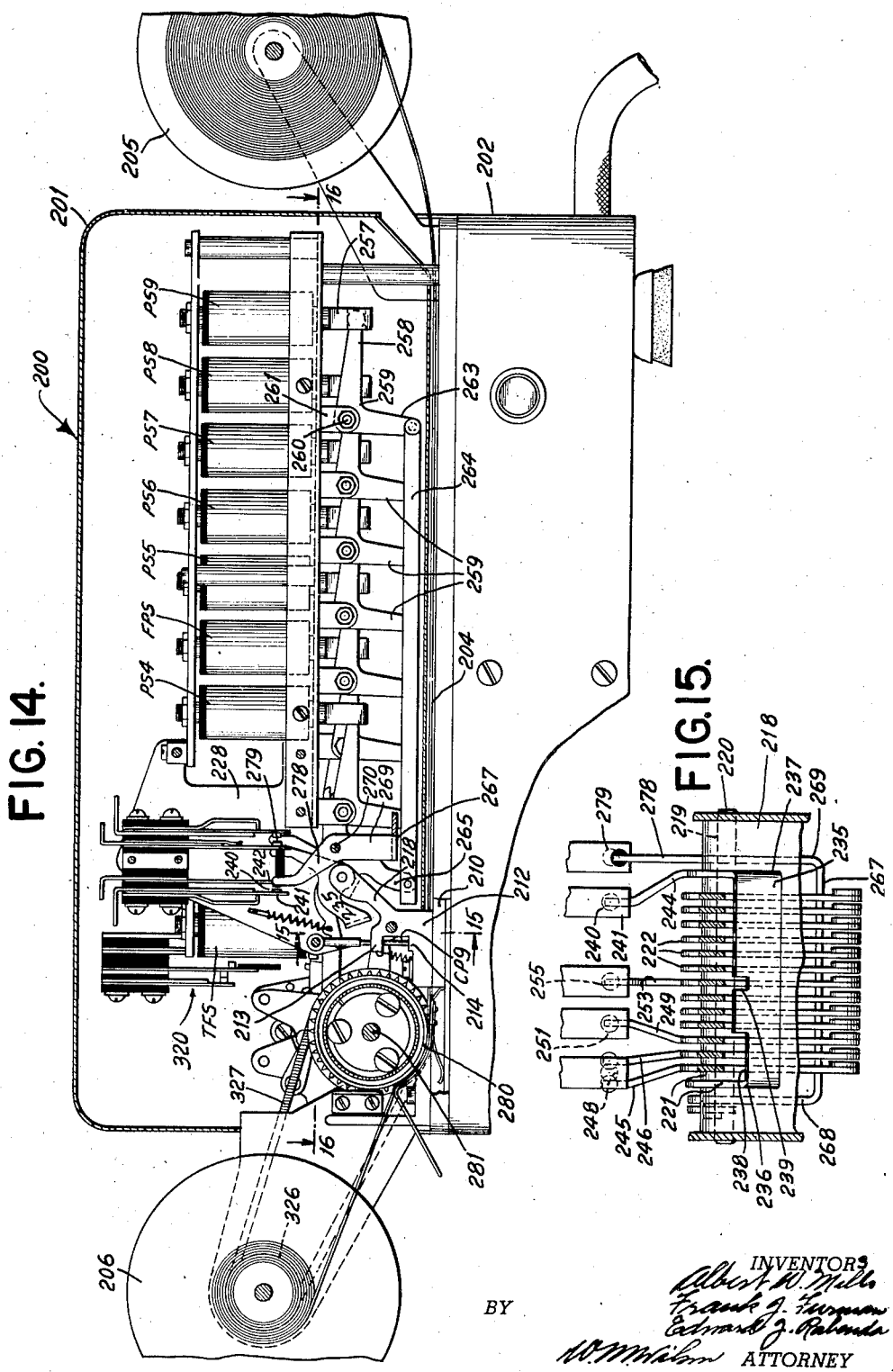

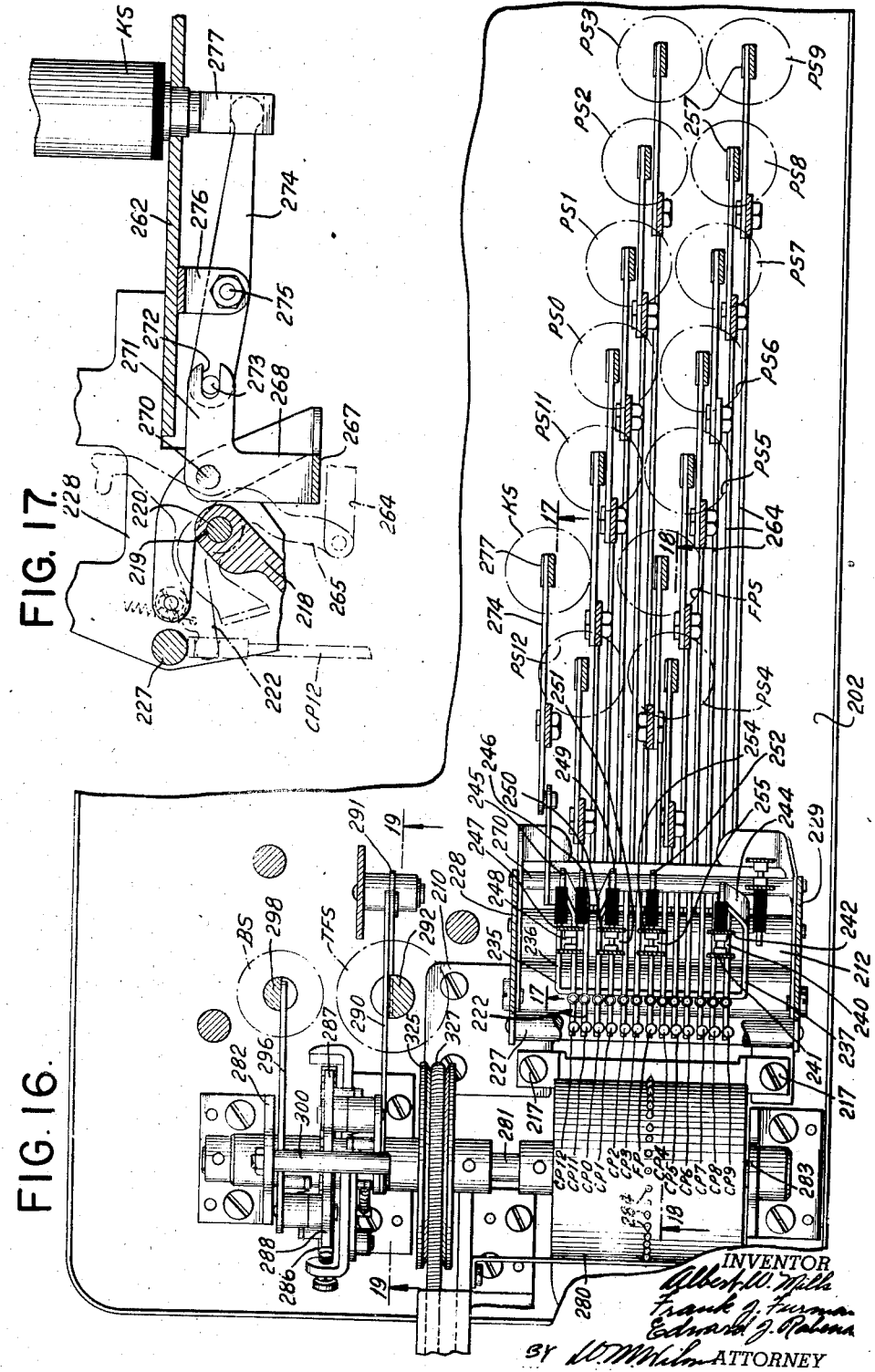

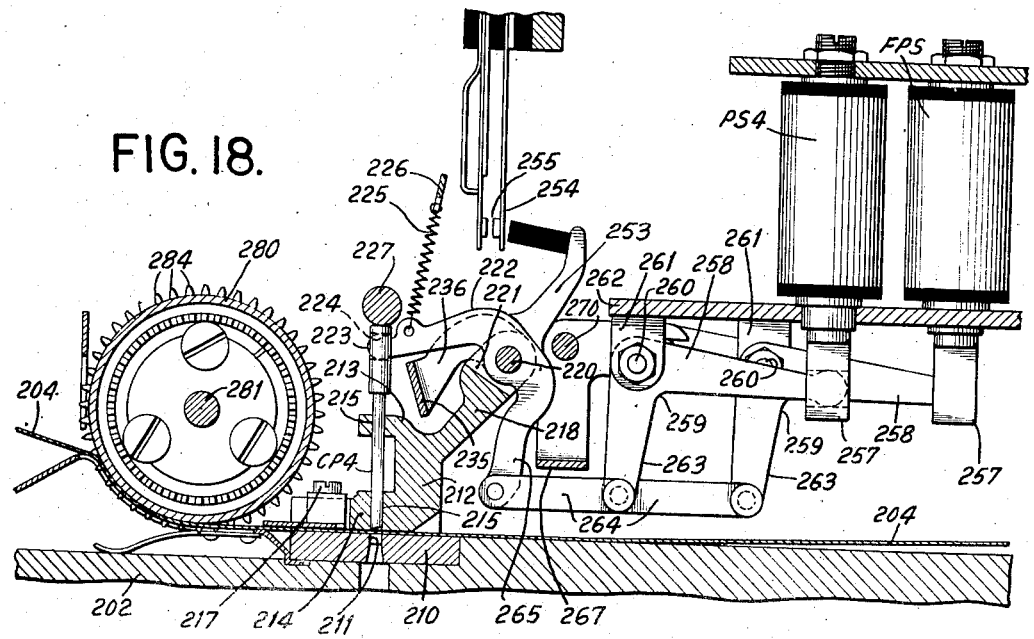
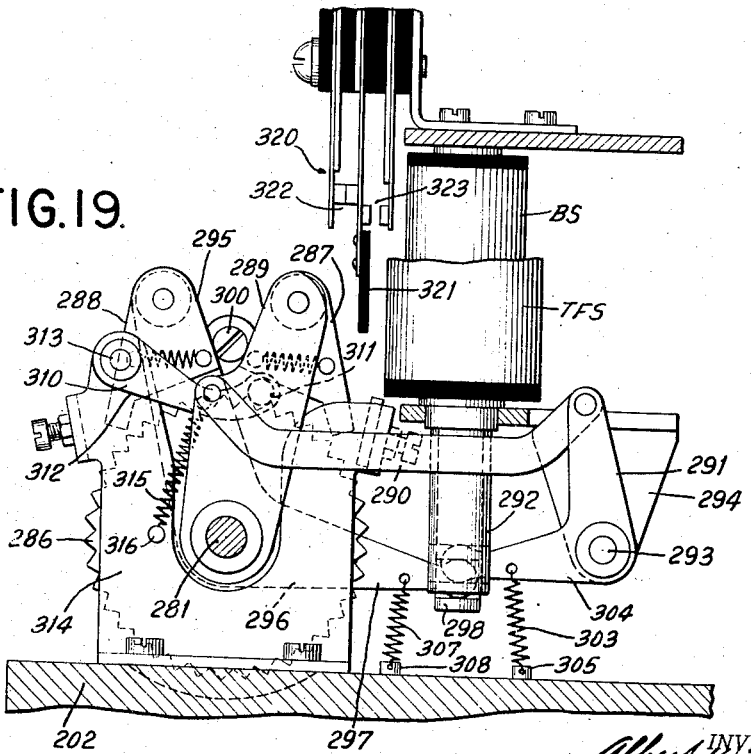

Patented June 5, 1945

2,377,801

UNITED STATES PATENT OFFICE 2,377,801

PUNCHING APPARATUS

Albert W. Mills and Frank J. Furman, Endicott, and Edward J. Rabenda, Binghamton, N. Y., assignors to International Business Machines Corporation, New York, N. Y., a corporation of New York Application December 23, 1943, Serial No. 515,372

26 Claims. (Cl. 164—113)

This invention relates to apparatus for recording data on a record strip, and it has for a general object to provide apparatus of this type which is of improved construction and arrangement of parts and which operates in a simple and effective manner.

An example of apparatus of the above type is a combined typewriter and code perforator, wherein as the keys of the typewriter are depressed in the usual manner to type desired data on a work sheet carried by the typewriter carriage, the code perforator is concomitantly operated therewith to record in a record strip code designations of the data being typed. As will be appreciated by those skilled in this art, the strip with the data recorded therein may be used for a variety of purposes; for example, the code used in recording the data may be a twelve position combinational hole code, and the prepared record strip may be used to control the operation of a card punch so as to prepare record cards therefrom for use in tabulating machines.

A further object of this invention is to provide recording apparatus having a new and improved form of operating control which upon the initiation of a recording operation prevents a second recording operation until the first named operation is completed.

A further object is to provide a cyclically operated recording apparatus wherein each cycle is divided into a plurality of steps occurring in a definite order and wherein is provided a new and improved control which assures the completion of each step before the next step commences and which assures the completion of the last step before a new cycle of operation can be initiated.

A still further object is to provide a typewriter controlled code recorder having a new and improved means for controlling the operation thereof and which prevents the operation of the typewriter keys during certain predetermined times.

A further object is to provide a typewriter controlled code recorder wherein provision is made for automatically tabulating the typewriter carriage between selected points without affecting the operation of the recorder.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a perspective view showing a combined typewriter and tape punch constructed in accordance with the present invention;

Fig. 2 is an enlarged vertical sectional view through the typewriter, the section being taken on the line 2—2 of Fig. 1;

Fig. 3 is an enlarged plan sectional view showing a portion of the back of the typewriter, with certain of the parts being omitted and others broken away so as to illustrate more clearly the tabulating mechanism for the typewriter carriage and certain of the control devices, the plane of the section being indicated generally by the broken line 3—3 in Fig. 2;

Fig. 4 is a fragmentary vertical section taken on the line 4—4 of Fig. 3;

Fig. 5 is a vertical elevation showing in full lines one of the control stops, and indicating in dash lines the position of the contact operating tabs on the other three control stops;

Fig. 6 is a fragmentary vertical section taken on the line 6—6 of Fig. 3;

Fig. 7 is a fragmentary vertical section showing the tab key lever and its related cam unit and the set of key contacts operated thereby;

Fig. 8 is a fragmentary vertical section showing the back-space key lever and its cam unit and the set of contacts operated thereby;

Fig. 9 is a fragmentary perspective view showing the carriage-return key lever and its related cam unit, and also showing the clutch and the contacts operated thereby;

Fig. 10 is a fragmentary vertical section showing the shift key lever and its cam unit, and the case shifting mechanism operated thereby;

Fig. 11 is a fragmentary view showing in front elevation a portion of the key lever comb, some of the key levers, and the solenoid operated mechanism for locking the keyboard, the plane of the view being indicated by the line 11—11 of Fig. 2;

Fig. 12 is a fragmentary vertical section taken on the line 12—12 of Fig. 11;

Fig. 13 is a detail section showing the type bar operated by the error indication key;

Fig. 14 is a vertical longitudinal view of a tape punch and showing the base part of the tape punch in vertical elevation and the upper part of punch in vertical section with the plane of the section being just inside the vertical front wall of the punch;

Fig. 15 is a fragmentary vertical section taken on the line 15—15 of Fig. 14;

Fig. 16 is an enlarged fragmentary plan section taken on the line 16—16 of Fig. 14;

Fig. 17 is a fragmentary vertical section showing the knock-off solenoid and the mechanism operated thereby, the plane of the section being indicated by the line 17—17 of Fig. 16;

Fig. 18 is a fragmentary vertical section taken on the line 18—18 of Fig. 16;

Fig. 19 is a fragmentary vertical section taken on the line 19—19 of Fig. 16;

Figures 20, 21, 22:
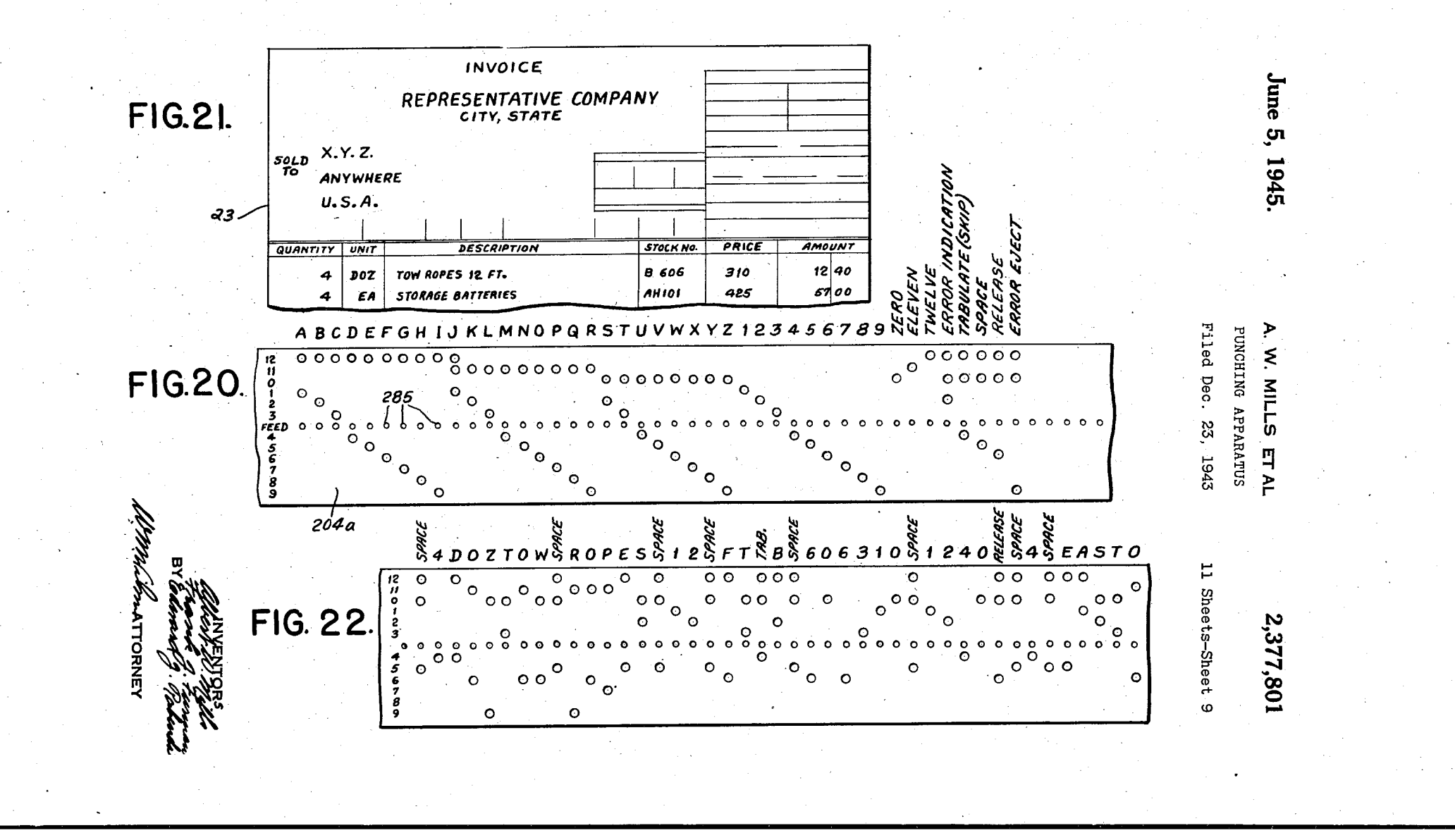
Figure 23A:
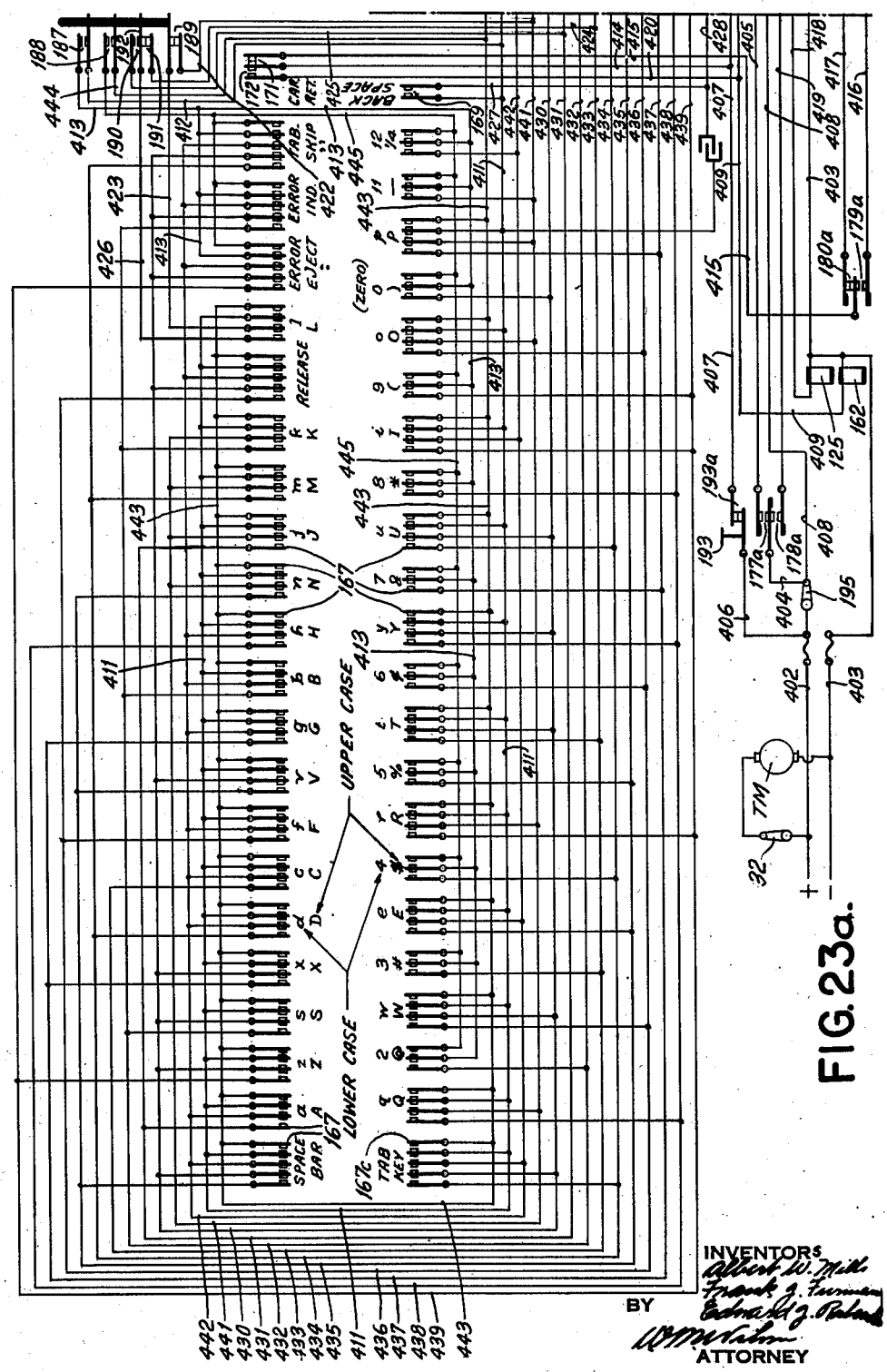
Figure 23B:
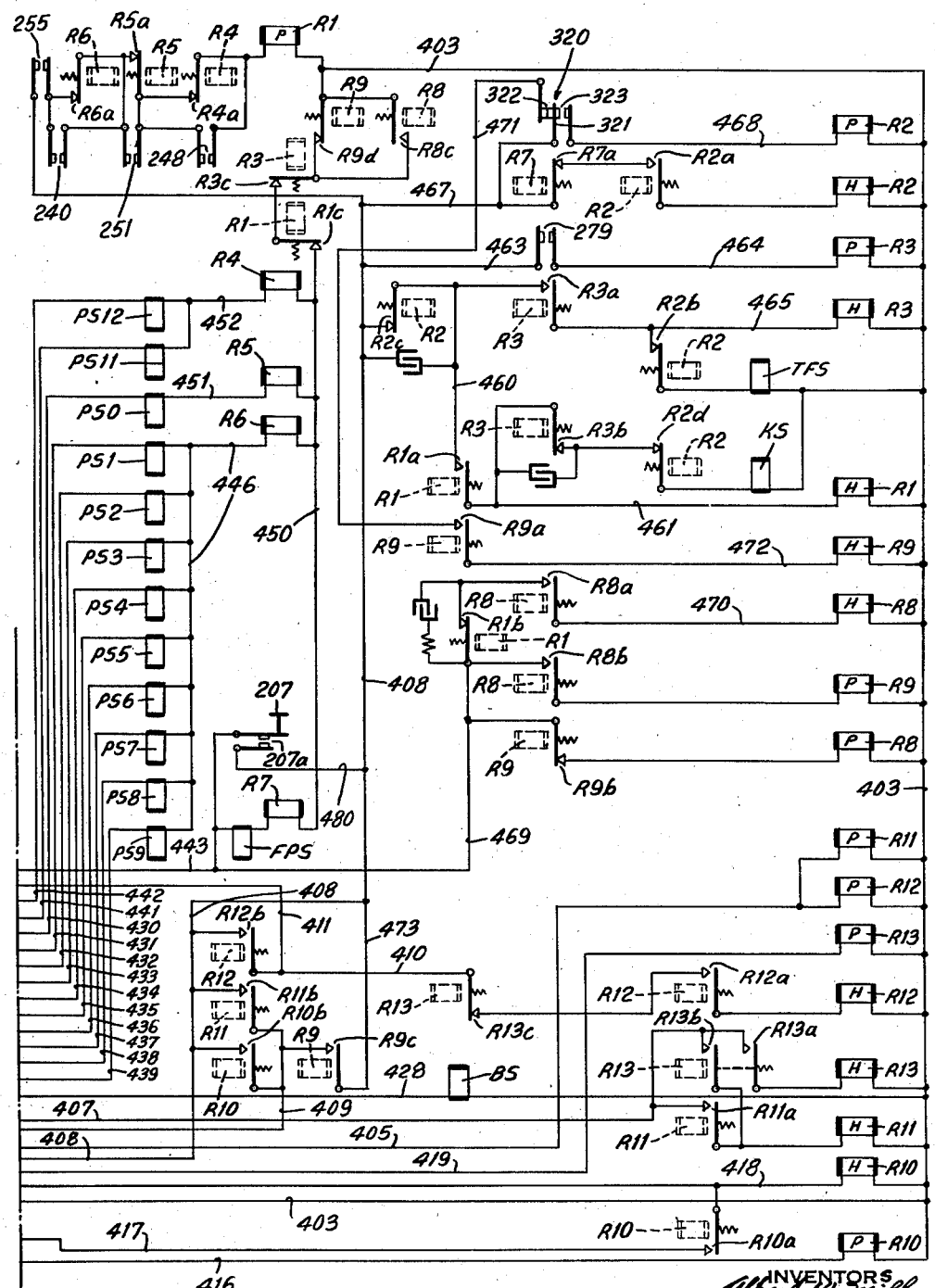

Fig. 20 is a view showing a portion of a record tape in which have been punched according to a selected twelve position combinational hole code, code designations for the letters of the alphabet, for the numerals 0 to 9 inclusive, for control positions 11 and 12, and also code designations corresponding to certain functional operations of a tabulating card punch which the tape is adapted to control;

Fig. 21 shows a portion of a sample invoice on which typical items have been typed;

Fig. 22 shows a portion of a tape in which appears the code designations corresponding to a portion of the items included in Fig. 21;

Figs. 23a and 23b together form a two-part wiring diagram showing the various control circuits and electrical instrumentalities of the embodiment disclosed.

As will be observed from an examination of Fig. 1, the invention is shown herein as embodied in a typewriter controlled tape punch. The typewriter is indicated generally by the reference character 20 and the tape punch by the character 200.

The typewriter comprises the usual keyboard including character and functional keys, and a carriage 21 carrying a platen 22 which supports a work sheet 23 on which the data is typed in the conventional manner.

The tape punch 200 is suitably enclosed within a housing 201 which includes a base 202 and a removable cover 203. The blank tape 204 is wound upon a supply spool 205 rotatably supported at the right-hand end of the punch as viewed in Fig. 1. A storage spool 206 for the punched tape is rotatably mounted at the opposite end of the punch and, as will presently appear, is indexed for each recording operation so as to provide for spacing the tape and thereby present a new field for recording. As can be seen from an examination of Fig. 16, the tape punch 200 is provided with a plurality of code punching elements CP12, CP11, CP0, CP1, CP2, CP3, CP4, CP5, CP6, CP7, CP8, and CP9, arranged in the order named and transversely of the plane of the tape and corresponding, respectively, to the twelve code positions of a selected combinational code which can be used to record in tabulating cards both alphabetical and numerical data. The punch 200 is also provided with a feed hole punching element FP positioned between code punch elements CP3 and CP4.

In Fig. 20 there is shown a sample strip 204a of tape containing the various alphabetical and numerical code designations of the selected combinational hole code referred to above. In the strips 204a, there is punched the code designations for the twenty-six letters of the alphabet, for the numerals 0 to 9 inclusive, and for the control positions 11 and 12. Also, additional code designations are provided which may be used to control certain functional operations of a card punching unit when the record tape is used for punching tabulating cards. These functional code designations are indicated in Fig. 20 as follows: "Error indication," "Tabulate (skip)," "Space," "Release," and "Error eject." Obviously these code designations may be varied to suit the particular card punching machine, or other type of machine, with which the prepared record tape will be used. The functional code designations indicated are merely given as examples of what may be required in the controlling of the operation of a card punching machine. An example of a punching machine has not been included herein as such machines are well known to those skilled in this art and form no part of the present invention.

In Fig. 20, the twelve positions for the code holes are indicated at the left-hand end of the strip 204a by corresponding numerals and the feed hole position by the legend "feed." The different code designations are punched in successive recording fields, which fields extend, respectively, transversely of the tape. It will also be noted that the character and functional operation corresponding to each code designation, is indicated at the top edge of the strip and opposite the recording field in which its particular designation is punched.

As will appear more fully hereinafter, the typewriter and tape punch are connected for concomitant operation by electrical control means which is disclosed diagrammatically in Figs. 23a and 23b and which includes as a part thereof a plurality of circuit wires enclosed within a cable 400 appearing in Fig. 1. The control means is such that each time a typewriter key is depressed which corresponds to one of the characters of the selected combinational hole code, or which corresponds to the functional operations described above in connection with Fig. 20, the punch is operated to record in a recording field of the tape the code designation for the key depressed. As a part of each such recording operation of the punch, the tape is also spaced or indexed to bring into recording position the next recording field.

Insofar as certain of the broader aspects of the present invention are concerned, the typewriter 20 may be of any desired construction. However, in the illustrative embodiment there is advantageously included a well known commercial form of power driven typewriter. The structural features and principles of operation of this typewriter are fully disclosed in a number of U. S. patents, among which are Patent No. 1,777,055, granted September 30, 1930, and Patent No. 1,873,512, granted August 23, 1932. These patents disclose the general principles of operation of the key levers and how they control through related cam units, the operation of the type bars, and the manner of spacing the typewriter carriage. In view of the detailed description of the construction and operation of the parts given in the patents just mentioned, only a brief description will be given herein which will be sufficient to enable the present invention to be understood.

The details of construction of the typewriter are disclosed herein in Figs. 1 to 13 inclusive. As shown in Fig. 2, the alphabetical and numerical character keys 25 are mounted, respectively, on key levers 26, the latter being pivoted on a rod 27 which is supported by a cross frame 28 rigidly mounted in the typewriter frame. Rotatably mounted in the base 29 is the power roller 30 which is rotated in the direction of the arrow by means of a D. C. motor, not shown in Fig. 2, but indicated diagrammatically at TM in Fig. 23a. When the machine is in use, the power roller rotates continually. A power switch 32 for the typewriter motor is shown at the left of the keyboard in Fig. 1 and is also indicated diagrammatically in Fig. 23a.

Cooperating with the power roller 30 are the cam units 33 which are pivotally mounted on rods 34 extending parallel with the power roller 30. There is a cam unit 33 associated with each of the keys 25 and their related key levers 26, and each of the cam units which is operated by a character key 25, is connected by a link 35 with a sub-lever 36 pivoted on rod 27. The sub-levers 36 are connected by links 37 to type bars 38 through the medium of toggles 39. The type bars 38 are pivoted in the usual wire segment 40 and the latter is provided with a type guide 41 located in front of the platen 22. As stated previously, the platen is adapted to support the work sheet 23 and is rotatably mounted in the carriage 21, and the latter is supported for lengthwise movement on front and rear rails 44 and 45, respectively, by means of suitable anti-friction roller trucks. Springs 46 connected to a curved spring anchoring member 47 and to toggles 39, provide means for locking the toggles in their normal or inactive position shown in Fig. 2.

When any character key 25 is manually depressed, its related cam unit 33 is caused to operatively engage the power roller 30 in a well known way, thereby rocking the cam unit 33 clockwise or counterclockwise, according to whether the operative cam unit is pivoted on the left hand or right hand rod 34, respectively, as viewed in Fig. 2. The rocking of the cam unit 33 causes its link 35 to be drawn downwardly, thereby rocking the corresponding sub-lever 36 in a clockwise direction. This movement of the sub-lever 36, through the corresponding link 37 and toggle 39, causes the type bar 38 associated with the selected key to rock in a counterclockwise direction to effect the impression of the type upon the work sheet 23 wrapped around the platen 22. The type bar, near the end of its operating stroke, engages the usual universal bar 50 and causes the universal bar to move rearwardly and downwardly as viewed in Fig. 2 to space the carriage forward. As explained in the patents aforementioned, the bar 50 is connected through a link 51 with a rock lever 52; and, when the universal bar 50 is moved by the type bar in the manner just explained, the lever 52 is rocked clockwise to operatively engage the escapement pawls 53 and move the latter out of engagement with the escapement rack 54 carried by the carriage 21, and thereby space the carriage one letter space or column.

As will be readily understood from an examination of the above mentioned Patent No. 1,873,-512 and Fig. 2 of the present drawings, one of the cam units 33 is operated by manually depressing the space bar 55 and its related key lever, and such cam unit when operated effects through the link 56 and lever 57 (appearing in dot and dash lines in Fig. 2), the actuation of the escapement pawl lever 52 and pawls 53 to space the carriage one letter space position.

In addition to the alphabetical and numerical character keys 25, the typewriter keyboard also includes other character keys, which control the operation of cam units 33, and which are also used herein to effect the recording of the special functional code designations noted above in connection with the description of Fig. 20. As will be noted from an examination of Fig. 1, these other character keys are similar to the character keys 25 and are identified as follows: a key 14 which effects the recording of the control position 11, a key 15 which records control position 12, a key 16 which records the functional code designation "Error indication," a key 17 which records the functional code designation "Tabulate (skip)," a key 18 which records the functual code designation "Release," and a key 19 which when depressed records the code designation "Error eject." The construction and operation of the keys 14, 15, 16, 17, 18 and 19 will be described more fully hereinafter.

The segment 40 is mounted in a frame 60 which forms part of the type basket. With special exceptions which will be noted hereinafter, each type bar 38 is provided with upper and lower case type 61 and 62, respectively. The type basket, with the type bars mounted therein, is movably mounted in the frame work of the machine to provide case shifting. For typing when the typewriter is disconnected from the tape punch, the type basket will ordinarily occupy an elevated position where lower case characters are printed, and when it is desired to type upper case characters the type basket is shifted downward.

When the typewriter is connected for concomitant operation with the punch in accordance with the present invention, the typing of all alphabetic characters and the recording of corresponding code designations are affected with the type basket occupying the lowered or upper case position, which is the position of the type basket shown in Figs. 2 and 10. When it is desired to type the numerals 0 to 9 inclusive and concomitantly to record their respective code disignations; to record by depressing the keys 14 and 15, the control positions 11 and 12, respectively; and to record by depressing keys 16, 17 and 19 the functional code designations "Error indication," "Tabulate (skip)," and "Error eject," respectively; the type basket is shifted to its elevated or lower case position. To record the code designation "Release" by depressing the "Release" key 18, the type basket may be in either case position. The "Space" code is recorded by depressing the space bar with the type basket in either case position. The "Tabulate (skip)" code designation is also recorded each time the tabulating key 65 is depressed to tabulate the typewriter carriage in a manner which will be presently explained. The latter operation may be effected with the type basket in either case position.

The mechanism for shifting the type basket is fully shown and described in U. S. Patent No. 1,945,097 granted January 30, 1934, and is partly shown in Fig. 10 herein. The shift key lever 67, with the shift key 68 mounted thereon, is shown in its depressed position and is being held in such position by the lower hooked end 69 of the shift lock key 70 engaging a detent 71 fixed to a part 72 of the frame. When the shift lock key 70 is released from the detent 71, the spring 73 will move the shift lever upward to its normal position.

Secured, respectively, to the back of the type basket frame 60 and on opposite sides thereof, are two brackets 75 (see also Fig. 2). The brackets 75 are connected by links 76 to the outer ends of lever arms 77, the latter being fixed respectively, on the ends of a transverse shaft 78 journaled in the framework of the machine. Pivoted on a stud 79 at one side of the machine is a lever 80 having two pins 81 and 82, respectively, engageable by the short arms of a T shaped lever 83, the latter being pivotally mounted at 84 on one arm 85 of a three-arm lever 86. The lever 80 is connected by a link 87 to the outer portions of one of the lever arms 77 and at points spaced from the connection of such arm and its link 76. The T lever 83 has a stud 89 projecting into a slot formed in an arm 90 comprising an extension of the left-hand shift key lever 67 as viewed in Fig. 1. One arm of lever 86 is connected by a link 91 to a cam unit 33a which is controlled by the shift key lever 67 in substantially the same manner as cam units 33 are controlled by the key levers 26, described above.

The type basket is shifted upward to lower case position when the shift key lever 67 is released and moved upward under force of the spring 73, and the type basket is shifted downward to upper case position when the key lever 67 is moved downward to the position shown in Fig. 10. As stated previously, the shift lock key 70 holds the key lever 67 in its lower position while writing upper case characters.

When the shift key lever 67 is released by depressing the key 68 so that the shift lock key will release itself in the well known manner, the lever 67 is moved upward by its spring 73 and the T lever 83 is lowered to bring the lower of the short arms thereof to a position to the left of the pin 82. The upward movement of the lever 67 also provides for the actuation of the cam unit 33a. However, the just described movement of the T lever takes place before the cam unit 33a is operatively connected to the power roller 30. When the cam unit 33a is operated in the manner just stated, the link 91 is drawn downward, thereby rocking lever 86 in a clockwise direction. This draws the T lever 83 to the right as viewed in Fig. 10, and thereby through the engagement of said T lever with the pin 82, rocks the lever 80 counterclockwise. Consequently, through the link connection 87, the lever arms 77 connected thereto and the shaft 78 are rocked in a clockwise direction, thereby moving upward the links 76 which result in the type basket being moved upward to lower case position.

As disclosed fully in the aforementioned U. S. Patent No. 1,945,097, when the key lever 67 is manually depressed so that it is moved downward to the position shown in Figs. 2 and 10, the cam unit 33a is again actuated by the power roller 30 so that the cam unit rocks in a counterclockwise direction as before. When the key lever 67 is depressed and before the cam unit 33a is actuated, the arm 90 of the lever 67 moves upward and thereby moves the T lever 83 upward to bring the upper of its short arms to a position to the left of the upper pin 81. Consequently, when the cam unit 33a is rocked counterclockwise, as just stated, the cam unit through the link 91 rocks the lever 86 clockwise, and the latter through the T lever 87 and pin 81, rocks the lever 80 clockwise. The lever 80, through the link 87, rocks the arm 77 and shaft 78 counterclockwise to return, through the links 76, the type basket to the upper case positioned shown.

The mechanism for back spacing the typewriter carriage is disclosed in Figs. 3 and 8, and operates in the same manner as the construction disclosed fully in U. S. Patent No. 1,873,553, granted August 23, 1932. In Fig. 8 herein, the back space key 93 is shown as mounted on a key lever 94 which is pivoted on the rod 27. When the key 93 is depressed, the lever 94 is pulled downward to operate a cam unit 33b, similar in construction and operation to the cam unit 33 shown herein in Fig. 2 at the left of the power roller. When the cam unit 33b is operated, it pulls down a link 95 connected to one end of a rock lever 96 which is pivotally supported on the rod 27. The other end of rock lever 96 is connected by a link 97 (see also Fig. 3) to one arm of a bell crank 98 pivotally mounted on the rear fixed rail 45. The other arm of the bell crank 98 is connected by a link 99 to a pivoted dog 100 having a tooth 101 formed on its outer end and adapted to engage with the teeth of the escapement rack 54 mounted on the carriage 21. As is explained fully in the aforementioned U. S. Patent No. 1,873,553, when the bell crank 98 is rocked clockwise, as viewed in Fig. 3 herein, the link 99 moves the dog 100 clockwise and at the same time downwardly and into engagement with the teeth of the rack 54 so that the carriage 21 is moved to the right, or backward, one space.

The tabulating mechanism for the typewriter is shown more clearly in Figs. 3, 6, and 7. Fig. 7 shows the tabulating or "Tab" key 65 and key lever 104 and its related cam unit 33c. The cam unit 33c is similar to the cam unit 33, shown at the left of the power roller 30 in Fig. 2; and, lever 104 in the same manner as the operation as will be readily understood, is manually operated by depressing its related key 65 and key previously described in connection with the cam units 33. The cam unit 33c is connected by a link 105 to one end of a rock lever 106 pivotally supported by the rod 27 and the other end of the lever is connected by a link 107 with a lever 108 pivoted to a bracket 109 mounted on the left hand end of the fixed rail 45 and operatively connected to the tabulating lever 110 shown in Figs. 3 and 6.

The tabulating mechanism shown in Figs. 3 and 6 is the same as is fully disclosed in U. S. Patent No. 1,935,436 granted November 14, 1933, and operates in the same manner as the structure disclosed therein, with the exception that instead of providing removable tabulating or column stops like the one indicated at "4" in the last mentioned patent, a plurality of column stops 115 are pivotally mounted on a rod 116 (see also Fig. 2) carried by a stop bar 117 which is in turn carried by the carriage 21 and are equal in number and correspond, respectively, to the letter space positions, or columns, in a line of typing. The latter type of pivoted column stop may be selectively and individually set by a key to be engaged by the tabulating lever 110 to stop the carriage at any related letter space position in the same manner as is disclosed in U. S. Patent 2,157,053, granted May 2, 1939.

As the detail construction and operation of the tabulating mechanism shown herein are well known to those skilled in this art and can be readily understood by reference to the two last mentioned patents, it would be needless duplication to describe the mechanism in full herein. It is considered sufficient for the purposes of the present disclosure, to state that the tabulating lever 110 is pivoted at 119 in such a manner that it has limited movement about an axis normal to the pivot 119 and to the plane of Fig. 3 of the drawings. When the cam unit 33c is operated, the link 107 pulls the left hand end of the tabulating lever 110 downward, or counterclockwise as viewed in Fig. 3, which is toward the rear of the typewriter, which results in the moving of the rearward projection 120 on the right-hand end of the tabulating lever, upward as viewed in Fig. 3, or toward the rear of the machine, where it will intercept and engage the next selected one of the column stops 115 to stop the carriage 21. The lever 110 in moving to the latter position, also moves by means of an arm 121, the escapement pawls 53 out of engagement with the rack 54 which will result in the carriage 21 being moved rapidly toward the left as viewed in Fig. 3. When the next preset column stop 115 is engaged by the projection 120, the lever 110 is moved clockwise back to the normal position shown and the escapement pawls 53 are released and thereby engage again the rack 54 to stop the carriage 21 at the letter space position corresponding to the selected one of the column stops which was just engaged.

As will be explained more fully hereinafter, provision is made for automatically tabulating the carriage 21 between selected letter space positions. This is effected by the energizing of a tabulating solnoid 125 mounted on a fixed rear part of the typewriter frame. When the solenoid 125 is energized, the armature 126 thereof is moved to the right as viewed in Fig. 3, which rocks the lever 127 counterclockwise about its pivot pin 128 and moves the link 129 forward, to move the left-hand end of the tabulating lever 110 forward and the right-hand end 120 rearward to effect tabulation of the carriage 21 in the same manner as just explained in connection with the manually controlled tabulating operation.

The mechanism shown herein for returning the carriage to begin a new line of typing is well known to those skilled in the typewriter art. Attention is directed to U. S. Patent No. 1,753,450, granted April 8, 1930 and U. S. Patent No. 2,104,-559, granted January 4, 1938, for a full disclosure of the structural details of the carriage return mechanism shown herein, the later granted patent being directed to the specific clutch shown herein for connecting the power roller to the drum about which the carriage return tape is wound. As is usual, the carriage return movement is accompanied by a line spacing operation.

Referring to Fig. 9, the carriage return key 130 is shown as mounted on a key lever 131 which is pivoted on the rod 27, and controls the operation of a cam unit 33d, similar in construction and operation to the cam units 33 previously described. The cam unit 33d comprises a single lobed cam 134 which is released by the depression of the key 130 and is rocked against the power driven roller 30 and thereby rotated through a full revolution. The cam 134 is journaled upon a bell crank lever 135 pivoted on the rod 34 and is connected by a link 136 to the end of a lever 137, which forms part of a clutch operating toggle mechanism. The lever 137 is pivoted at 138 upon a stationary bracket 139 and behind this bracket, the lever 137 is articulated to the end of a lever 140 pivoted at 141 upon a stationary bracket 142. An actuating arm 143, which also pivots about 141, is adjustably secured at its upper end to the lever 140, by a screw 144. The lower rounded end 145 of the arm 143 stands opposite the hub 146 of a friction clutch 147, rotatably mounted on an extension of the shaft of roller 30, which extension does not show in the drawing. The clutch 147, when pressed inward by the toggle mechanism, upon actuation of the carriage return key, clutches a spool 148 to the said extension of the shaft of roller 30. The spool has wound upon it a flexible band 149, which is attached in a well known manner to the carriage of the typewriter. Thus, when the clutch 147 is engaged, the band 149 is wound up and the carriage is returned to its right end position as viewed from the front of the typewriter. As explained fully in the patents last mentioned, when the carriage approaches the limit of its return movement, it effects, by means not disclosed herein, the clockwise movement of a bell crank 150, and so that an arm 151 of the bell crank engages the bottom edge of lever 137, which has been held down by the toggle action, and lifts the lever 137, thereby releasing the clutch 147 and stopping the carriage return movement.

In accordance with the present invention, means is provided for automatically locking the keyboard to prevent the depressing of the typewriter keys at certain selected times which will be explained more in detail hereinafter. The means for locking the keyboard is of the same general type as is disclosed in Patent No. 2,255,030, granted September 2, 1941, and is shown herein in Figs. 2, 11, and 12.

As shown, a fixed guide comb 155 extends across the front of the typewriter and is provided with a plurality of equally spaced vertical slots 156 receiving, respectively, the forward ends of the typewriter key levers. As is customary, a few extra slots 156 are provided to permit the provision of additional key levers, when desired. Within one of the extra slots 156 is disposed an interposer 157. A roller guide or race member 158 is fixed to the front of the guide comb 155 and is provided with vertical slots 159 registering, respectively, with the lower parts of slots 156 and also adapted to receive the forward ends of the key levers and the interposer 157. A series of interlocking rollers 160 are disposed within the race member 158. There are as many rollers as there are slots 156, plus one additional roller and the rollers are of such dimensions that when any one of the key levers, or the interposer 157, is depressed the rollers are displaced laterally across the lower parts of slots 159 and 156 and thereby prevent the depressing of the other key levers. The interposer 157 is fixed to the upper end of an armature 161 of a keyboard lock solenoid 162 and the interposer is normally held in the upper end of its slot 156 by a spring member 163. It will be apparent that when the solenoid 162 is energized the interposer 157 is moved downward and thereby displaces the rollers 160 and locks the keyboard in the manner just explained. Thus, provision is made for locking the keyboard from a remote control point, and the purpose thereof will be explained more fully hereinafter in connection with the wiring diagram of Figs. 23a and 23b.

The tape punch 200 is shown in detail in Figs. 14 to 19 inclusive. A die or stripper plate 210 is arranged transversely beneath the code punches CP1 to 9 inclusive, CP0, CP11, and CP12, and the feed punch FP, and is provided with twelve die openings 211 (see Fig. 18) for slidably receiving, respectively, the lower ends of the twelve code punches during punching operations, and is also provided with a smaller die opening (not shown) for receiving the lower end of the feed punch FP. The feed punch is preferably smaller in diameter than the code punch so that there will be no confusion in the punched tape between the feed holes and the code holes.

Mounted on the die plate 210 is the punch guide block 212 comprising upper and lower spaced flange members 213 and 214, respectively, in which are provided twelve pairs of aligned guide openings 215 slidably receiving the twelve code punches, and in which is also provided a smaller pair of guide openings (not shown) for receiving the feed punch. The twelve openings 215 and the feed punch openings in the guide block are aligned, respectively, with the twelve openings 211 and feed punch openings in the plate 210.

The guide block 212 and die plate 210 are fixed to the base 202 by suitable screws 217. As will be apparent, the machined flat under surface of the lower flange member 214 is upwardly spaced from the machined flat upper surface of the die plate 210 to provide a rectangular shaped slot through which the tape 204 is fed for the purpose of bringing successive recording fields into punching position beneath the punches.

As shown more clearly in Figs. 15 and 18, the guide block 212 is also provided with an upwardly and rearwardly extending integral part 218 which is formed with a transversely extending bore 219 receiving a fulcrum pin 220. The upper right-hand edge of the bar 218, as viewed in Fig. 18, is formed with a plurality of spaced vertical slots 221 receiving, respectively, punch actuating bell cranks 222 which are pivoted intermediate their ends on the pin 220. The left-hand-arm of each bell crank 222 is formed at its outer end with a cylindrical outer surface 223 and fits within a slot 224 formed in the side of a code punch or feed punch. A bell crank 222 is provided for each of the code punches and for the feed punch and the just described construction provides a pivotal and slidable connection which enables the punches to be actuated by their respective bell cranks. The bell cranks and their punches are held in their normal or inactive position shown in the drawings by tension springs 225 connected, respectively, at their lower ends to the cranks 222 and at their upper ends to a fixed bar 226, and by a stop rod 227 against which the upper ends of the punches are held by the springs 225. The bar 226 and the stop rod 227 are fixed at their respective ends to a pair of opposed side plate members 228 and 229 fixed to the vertical side edges of the guide block 212 (see also Fig. 16).

A contact operating bail 235 is formed with two end members 236 and 237 which fit, respectively, within a pair of the vertical slots formed in the upwardly extending member 218, and which are pivoted on the pin 220. As shown in Fig. 15, the bail 235 is cut out as indicated at 238 opposite the bell cranks 222 which actuate the code punches CP12, CP11 and CP0 and is cut out as indicated at 239 opposite the bell crank which operates the feed hole punch FP, so that the actuation of the bell cranks corresponding to those punches will have no effect on the bail 235. However, when any one of the bell cranks for the punches CP1 to CP9 inclusive are actuated, the bail 235 is engaged and moved counterclockwise as viewed in Fig. 14 to close a pair of interlock bail contacts 240 (see also Fig. 16). One point of the contacts 240 is carried by the lower end of a fixed blade 241 and the other point is carried by the lower end of a movable spring blade 242 which normally occupies the open contact position shown. The blade 242 is adapted to be operated to close the contacts 240 by the outer end of an upwardly extending arm 244 formed on the end member 237, when any one of the bell cranks 222 which actuates the code punches CP1 to CP9 inclusive is operated.

The bell crank 222 which operates the code punch CP12 is provided with an upwardly extending contact operating arm 245, and also the bell crank 222 which operates the code punch CP11 is provided with an upwardly extending contact operating arm 246. Both the arm 245 and arm 246 are adapted to engage and move a movable spring blade 247 to close interlock contacts 248 when their related bell cranks 222 are actuated to operate their code punches CP12 and CP11, respectively. The crank 222 which operates the code punch CP0 is also provided with an upstanding contact operating arm 249 which, when the crank is actuated to operate its code punch, engages and moves a movable spring blade 250 to close interlock contacts 251. The crank 222 which operates the feed hole punch FP is also provided with an upstanding contact operating arm 253 which, when the crank is actuated to operate the feed punch, engages and moves a movable spring blade 254 to close interlock contacts 255 (see also Fig. 18). The means for selectively operating the code hole punches CP1 to CP9 inclusive, CP0, CP11 and CP12, and the feed hole punch FP comprises, respectively, code punch solenoids PS1 to PS9 inclusive, PS0, PS11, and PS12, and feed punch solenoid FPS. Each of the punch solenoids just named is provided with an armature 257 pivotally connected at its lower end to an arm 258 of a bell crank 259 which is pivoted intermediate its ends to a pin 260 carried by a bracket 261 in turn fixed to a stationary member 262 of the punch frame. Each bell crank 259 is provided with a second arm 263 which is connected by a link 264 with an arm 265 of the bell crank 222 which operates its respective punch. Thus, when one, or more, of the punch solenoids is energized its armature through its related bell crank 259, link 264, and bell crank 222 moves its respective punch downward to punch a hole in the tape.

The contact operating arms 245, 246, 249, 253, and 244 are so arranged with respect to their respective interlock contacts that the contacts are closed after their respective punches have passed through the tape.

At the end of a punching operation all punches are restored to their normal position shown in the drawings by a knock-off bail 267. The bail 267 comprises a pair of spaced end members 268 and 269 which are pivoted on a rod 270 which is in turn secured at its ends to the fixed side members 228 and 229, respectively. As shown in Fig. 17, the end member 268 is formed as a bell crank and includes an arm 271 extending to the right and having a slot 272 formed in its outer end and receiving a pin 273 carried by the outer end of one arm of a rocker 274. The rocker 274 is pivoted intermediate its ends on a pin 275 carried by a bracket 276 secured to the fixed frame member 262. The other arm of the rocker 274 is pivoted to the lower end of the armature 277 of a knock-off solenoid KS. When the knock-off solenoid KS is energized the rocker 274 is moved thereby counterclockwise and the knock-off bail 267 clockwise to engage the arms 265 of any punch operating rockers 222 which have been previously actuated, and move such rockers clockwise and their respective punches upward and back to their normal or inactive position.

As shown in Figs. 14 and 15, the end member 269 of the knock-off bail 267 is formed with an upstanding contact operating arm 278 which when the knock-off bail is actuated, engages the spring blade of knock-off contacts 279 and moves such arm 278 to close the contacts 279. The structure is such that the contacts 279 are closed at the end of the restoring movement of bail 267.

The means for feeding or spacing the tape for each recording operation comprises a tape feeding drum 280 fixed to a tape feed shaft 281, the latter being journalled at its ends within bearings carried by a pair of spaced upstanding brackets 282 and 283, respectively, which are mounted on the base 202. Radially extending feed pins 284 are carried by the drum 280 and are adapted to engage the feed holes 285 of the tape (see Fig. 20). A ratchet wheel 286 is fixed to the shaft 281 and is adapted to be engaged and indexed either by an advancing pawl 287 or by a reversing pawl 288 (see Fig. 19).

The advancing pawl 287 is carried by the outer end of an arm 289 journalled on the shaft 281, and the arm 289 is connected by a link 290 and bell crank 291 to the lower end of the armature 292 of a tape feed solenoid TFS. The bell crank 291 is pivoted on a pin 293 carried by the lower end of a fixed bracket 294. Each time the solenoid TFS is energized, the bell crank 291 is moved clockwise, as viewed in Fig. 19, the link 290 is moved to the right and the arm 289 clockwise. During such movement, the pawl 287 engages the ratchet teeth and moves the ratchet wheel 286 and feed drum 280 clockwise and sufficient to space the tape 204 to the left a distance equal to one recording field so as to bring a new field into recording position beneath the punches.

The reversing pawl 288 is carried by the upper outer end of a tape reversing arm 295 journalled on the shaft 281. The arm 295 forms one arm of a bell crank 296, and the other arm 297 of the bell crank is pivotally connected to the lower end of the armature 298 which forms a part of the back space solenoid BS. Thus, when the solenoid BS is energized, the bell crank 296 is moved counterclockwise and the pawl 288 engages the ratchet wheel 286 and moves the latter and the tape feed drum 280 counterclockwise enough to space the tape 204 backward the distance of one recording field.

The normal or inactive positions of the tape advancing arm 289 and back spacing arm 295 are against opposite sides, respectively, of a fixed stop 300 which extends outwardly from the bracket 282 (see also Fig. 16). The tape advancing arm 289 is held in its inactive position by a tension spring 303 connecting arm 304 of the bell crank 291 with a fixed stud 305 secured to the base 202. The tape reversing arm is held in its inactive position by a tension spring 307 connecting the arm 297 with a fixed stud 308 also secured to the base.

In order to provide for a ratchet wheel movement which accurately corresponds to the distance between two recording fields of the tape and in order to hold the tape between feeding operations, a detent 310 is provided. The detent 310 comprises a roller 311 engaging the space between ratchet teeth and carried by the outer end of an arm 312 which is pivoted on a pin 313 carried by a bracket 314 secured to the base 202. The bracket 314 also carries a journal bearing for supporting a mid portion of the shaft 281. The detent roller 311 is kept in engagement with the ratchet teeth by a tension spring 315 connecting a midpoint on the arm 312 with a fixed stud 316 projecting from the bracket 314.

As shown in Fig. 19 a set of transfer contacts 320 are adapted to be engaged and operated by the tape advancing arm 289 during the latter part of a tape advancing movement. A central movable spring contact blade 321 is adapted to be engaged by the arm 289 near the end of the tape advancing movement, and thereby moved from the normal position shown where contact points 322 are closed to a position where points 322 are open and contact points 323 closed. When the arm 289 returns to its inactive position the spring blade 321 will return to the normal position shown where points 322 are closed and points 323 are open.

As the tape is spaced in the above described manner by the advancing pawl or the reversing pawl, the storage spool 206 is indexed or partially rotated in the same direction as the movement of the tape. To this end, a pulley 325 is fixed to the tape feed shaft 281 and a second pulley 326 is fixed to the spindle on which the storage spool is mounted. The two pulleys are operatively connected by a suitable flexible driving belt 327.

As stated hereinabove the concomitant operation of the typewriter and tape punch is effected through an electrical control means. The control means includes, as a part thereof, a plurality of sets of contacts which are closed, respectively, by the depression of the typewriter keys and are connected by circuit wires with the punch solenoids to effect operation of related punches to record code hole designations in successive recording fields of the tape, which code designations, correspond, respectively, to the keys actuated. The control means provides for a definite cycle of operation initiated each time a typewriter key is depressed, and which cycle comprises a series of steps occurring in a definite sequence. These steps are, first, the selective energizing of the punch solenoids and the actuation of the punches corresponding to the key depressed; second, the energizing of the knock-off solenoid KS to restore the punches to normal position; and third, the energizing of the tape feed solenoid TFS to space the tape and thereby bring a new recording field into recording position beneath the punches. The control means also includes interlock means for assuring the completion of each of the operating steps before the next succeeding step is performed and for preventing the initiating of a second cycle of operation until all three steps are completed and the tape spaced. The control means also includes electrical means operating under the control of the typewriter carriage for automatically connecting and disconnecting the typewriter and tape punch for concomitant operation at selected letter space positions, and for automatically tabulating the carriage between selected letter space positions.

Referring again to Fig. 2, it is noted that the cam units 33 include, respectively, bell cranks 165 which are provided with downward extensions, each of which terminates in a contact operating roller 166 engaging an upper movable blade of a set of key contacts 167. It will be obvious that, when each cam unit 33 is operated as a result of depressing its related character key 25, the keys 14, 15, 16, 17, 18, and 19, or the space bar 55; the roller 166 attached to such cam unit moves to close its set of key contacts 167. Also, as shown in Fig. 7, the tabulating cam unit 33c is provided with a roller 166c which moves to close a set of key contacts 167c when the cam unit 33c is operated. As will appear more fully hereinafter, when the typewriter and punch are connected for concomitant operation, the closing of any set of contacts 167 or the set 167c will result in the energizing of the code punch solenoids corresponding to the code designation of the key actuated and in the energizing of the feed punch solenoid FPS.

As shown in Fig. 8, the back space cam unit 33b is also provided with a roller 168 which moves to close contacts 169 each time the back space key 93 is depressed. As will appear later, the contacts 169 close a circuit for energizing the back space solenoid BS, and do not provide for the recording of a back space code. If desired, however, provision could be easily made for also operating selected punch solenoids to record a back space code.

In Fig. 9, a roller 170 carried by the lower end of the bell crank 135 of the cam unit 33d, is moved each time the carriage return key 130 is depressed to open a pair of normally closed contact points 171 and to close a pair of normally open contact points 172. The points 171 will remain closed and the points 172 open until the end of the carriage return operation, at which time the cam unit 33d is returned to its normal position and thereby returning the contact points to their normal position. Neither the contact points 171 or 172 control the operation of punch solenoids. Their purpose will be explained later.

Referring again to Fig. 3 and also to Figs. 4 and 5, it is noted that a bar 174 is fixed to the typewriter carriage 21 and is provided with a plurality of pairs of grooves 175, with the grooves of each pair being formed in opposite sides of the bar 174 and with the pairs corresponding in number and spacing to the letter space positions or columns of the carriage and to the key-set column stops 115 previously described. Four different kinds of control stops are provided and they may be inserted, respectively, within the pairs of grooves at any selected column or letter-space position. These control stops function, respectively, when the carriage reaches the column where they have been placed, to open and close different pairs of contacts provided in control circuits and mounted within a contact assembly 176 fixed to the rear of the typewriter.

The four kinds of control stops are identified as control stop 177 which may be termed the "punch start" stop and is positioned on the bar 174 at the column where the concomitant typing and punching operation is to start; the control stop 178 which may be termed the "punch stop" stop and is positioned on the bar 174 at the column where concomitant typing and punching are to stop; control stop 179 which may be termed the "tabulating start" stop and is placed on the bar 174 where automatic tabulation is to start; and control stop 180 termed the "tabulating stop" stop and is placed on the bar 174 where automatic tabulation is to stop. Ordinarily, there will be only one stop 177 and one stop 178. A stop 179 and a stop 180 are arranged as a pair between the columns where the stops 177 and 178 are placed, and there may be as many pairs of stops 179 and 180 as there are areas over which it is desired for the carriage 21 to be automatically tabulated.

Fig. 3 shows a preselected arrangement of control stops for a particular problem which will be described more fully hereinafter in connection with Figs. 21 and 22. It is noted that a stop 177 has been placed in column or letter space position #12 where it is desired for the typewriter and punch to begin concomitant operation; and that a stop 178 has been placed in column #87 where concomitant operation is to stop. Between the stop 177 and stop 178 there have been positioned four pairs of stops 179 and 180. In one pair the stop 179 thereof is in column #14, and the stop 180 is in column #17. In the next pair, the stop 179 is in column #20 and the stop 180 in column #23. In the next pair, the stop 179 is in column #62 and the stop 180 is in column #69. In the last pair, the stop 179 is in column #72 and the stop 180 in column #80. It is noted that a column stop 115 has been set to be engaged by the projection 120 on the tabulating lever 110, in each of the columns where a stop 180 has been placed.

The contact assembly 176 is fixed to the rear of the typewriter frame and comprises four vertically spaced contact operating levers 181, 182, 183, and 184 which operate, respectively, four pairs of contact points 177a, 178a, 179a, and 180a. The contacts 177a, 178a, and 179a are normally open and are closed by their respective contact operating levers. The contacts 180a are normally closed and are opened by the lever 184. The control stops 177, 178, 179, and 180 are provided, respectively, with tabs 177b, 178b, 179b and 180b. The latter are so positioned vertically that they engage and move, respectively, the levers 181, 182, 183, and 184, and thereby operate their related pairs of contacts when the carriage 21 reaches the column positions where the control stops have been positioned. In Fig. 5 the control stop 177 is shown with its tab 177b. The relative vertical positions which the tabs 178b of stop 178, tab 179b of stop 179 and tab 180b of stop 180 occupy are indicated by dash lines.

In addition to the foregoing, the typewriter is provided with a plurality of selector contacts which are operated by an actuator arm 186 fixed to the shaft 78 which forms a part of the basket shift mechanism (see Figs. 2 and 23a). The selector contacts comprise the pair of points 187, a pair of points 188, a pair of points 189, and a set of transfer contacts including a fixed contact point 190, a fixed point 191, and a movable point 192.

When the type basket is in upper case position, the position shown in Figs. 2 and 23a, where alphabetic typing and concomitant code recording are effected, the points 187 and 188 are open, the points 189 are closed, and the movable point 192 engages fixed point 191. When the shift key lever 67 is released and the type basket shifted to lower case position where the numerals are typed and code designations therefor recorded and where certain special functional code designations are recorded, the shaft 78 is rotated clockwise and moves therewith the arm 186 which permits the selector contacts to move upward due to the inherent spring force of the spring blades thereof. Such upward movement of the spring blades closes points 187 and 188, opens points 189 and shifts movable point 192 into engagement with point 190. The purpose of the selector contacts will be fully explained hereinafter in the description of the wiring diagram of Figs. 23a and 23b.

As shown in Figs. 1 and 23a, the typewriter is also provided with a manual punch control button 193 which is located on the front of the typewriter. As will later appear, when the button 193 is depressed it opens a pair of normally closed contacts 193a forming a part of a circuit controlling the keyboard lock solenoid 162 and a part of a branch circuit including the control stop contacts 179a and 180a. Also, at the right of the typewriter keyboard is a punch control switch 195 which controls the flow of current through the punch solenoid circuits and the punch control circuits.

On the front of the punch is provided a tape feed out button 27 which when depressed closes a pair of contacts 207a in a circuit including the feed punch solenoid FPS. As will presently appear the depressing of the button 207 provides for the punching of feed holes in the tape and for the feeding out of the tape by the solenoid TFS.

As stated previously, Figs. 23a and 23b when considered together, form a complete electrical wiring diagram illustrating the improved control means. The wiring diagram includes all of the electrical instrumentalities previously described, and also includes a number of control relays and the contacts operated thereby and also the circuit wires connecting the relays, contacts, and the previously described electrical instrumentalities. There are thirteen control relays, and they are indicated, respectively, by the reference characters R1 to R13 inclusive; and where the relay comprises both a pickup coil and a holding coil, the coils are shown separately and are indicated further by the letter "P" for the pick-up coil, and the letter "H" for the holding coil.

Before describing in detail the cycle of operation which takes place as a result of depressing a typewriter key it is best to consider first the control functions performed by the control contacts 177a, 178a, 179a and 180a which are operated, respectively, by the control stops 177, 178, 179 and 180 mounted on the typewriter carriage 21.

With both the typewriter control switch 32 and the punch control switch 195 in closed position and with the control stops 177, 178, 179 and 180 occupying the letter-space positions, or columns, shown in Figure 3; when the carriage 21 is moved to column #12, the contacts 177a will be closed by the punch start control stop 177 and as a result the pick-up coils of relays R11 and R12 will both be energized by a circuit traceable as follows: from a wire 402 which is connected to the positive side of a source of direct current, through switch 195, a wire 404, contacts 177a now closed, a wire 405, the pick-up coils of both relays R11 and R12, to a wire 403 which is connected to the negative or return side of the direct current source. When relays R11 and R12 are thus picked up they close their related contacts R11a and R11b, R12a, and R12b, respectively.

The closure of contacts R11a establishes a holding circuit through the holding coil of R11 which is traceable as follows: from the positive wire 402, through a wire 406, normally closed contacts 193a, a wire 407, contacts R11a, and through the holding coil of R11 to the negative side of the line by wire 403.

Contacts R11b when closed establish a circuit through the keyboard lock solenoid 162 which is traceable as follows: from the positive wire 402, switch 195, wire 408, contacts R11b, a wire 409, and through solenoid 162 to the return wire 403. As described previously, the solenoid 162 when energized moves the interposer 157 downward within its slot 156 and thereby displaces the rollers 160 laterally to lock the keyboard so as to prevent the depressing of any of the typewriter keys. The keyboard may be unlocked by depressing the manual punch control button 193, which opens the contacts 193a and the circuit through the holding coil of R11, thereby opening contacts R11a and R11b. The opening of contacts R11b breaks the circuit through the keyboard lock solenoid 162.

The closing of contacts R12a and R12b establishes a holding circuit through the holding coil of R12 which is traced as follows: from the positive side through wires 402 and 408, through contacts R12b, a wire 410, normally closed contacts R13c, contacts R12a and the holding coil of R12 to the return wire 403. As long as contacts R13c remain closed, relay R12 will then be held energized by the circuit just traced and the positive wire 402 will be connected through the contacts R12b and wire 410 to a wire 411 which supplies current to the typewriter key contacts.

As shown, the hot wire 411 connects the wire 410 directly to one contact of each of the sets of key contacts 167 which represents an alphabetic character; connects the wire 410 to a contact of the set of contacts 167 operated by the space bar 55; to a contact of the set 167c operated by the tabulating key 65; to a contact of the set of contacts 167 operated by the "Release" key 18; and to one of the pair of contacts 169 operated by the back space key 93. When the type basket is shifted to lower case position; the selector contacts 187 will be closed by the arm 186 of the selector means previously described. The hot wire 411 will then be also connected by a wire 412 and the contacts 187 to a wire 413 which, as shown in Fig. 23a, is connected to one contact of each of the remaining sets of key contacts 167 which are as follows: the key contacts controlled by the keys 25 corresponding to the numerals 0 and 2 to 9 inclusive, the control code position keys 14 and 15, and the functional code keys 16, 17 and 19.

As will presently appear, when the sets of key contacts are connected to the positive wire 402 in the manner just described, the depressing of the typewriter keys will selectively close circuits through the punch solenoids to record in the tape the code designation for each key depressed and will thereby provide for the concomitant operation of the typewriter and punch. From the foregoing, it is apparent that before the carriage 21 reaches the column #12 typing may be effected in the customary manner without operation of the punch; but, when column #12 is reached the control contacts 177a are closed to automatically connect through start contacts R12b the typewriter and punch for concomitant operation and also to automatically lock the typewriter keyboard through the closed contacts R11b. The locking of the keyboard serves to notify the operator that the typewriter and punch are connected. As stated previously, the keyboard is unlocked by depressing the manual punch control key 193 which opens contacts 193a and the holding circuit of R11, thereby opening contacts R11b and the circuit through solenoid 162. However, the opening of contacts 193a does not affect the circuit through start contacts R12b to the key contacts.

As explained above, pairs of control stops 179 and 180 are located between letter-space positions, or columns, over which it is desired to automatically tabulate the carriage 21. Referring again to Fig. 3, it is noted that one of such pairs comprises a control stop 179 placed in column #14 and a stop 180 in column #17, and also that a key set column stop 115 is placed in column #17. Consequently, when the typewriter carriage reaches column #14, the stop 179 closes contacts 179a and thereby energizes the pick-up coil of relay R10 by a circuit traced as follows: from the positive wire 402, through wire 406, contacts 193a, wire 407, wire 414, normally closed carriage return contacts 171, a wire 415, contacts 179a now closed, wire 416, and through the pick-up coil of R10 to the negative wire 403. The energizing of relay R10 will close its contacts R10a and R10b.

Closed contacts R10a establish a holding circuit through the holding coil of relay R10 which is traceable as follows: from the wire 415 which is connected to wire 402 in the manner just explained, through the normally closed contacts 180a, a wire 417, now closed contacts R10a, wire 418, holding coil of R10 to the return wire 403. A branch circuit will also be established from the wire 418 through the tabulating solenoid 125 to the return wire 403.

As described above, when solenoid 125 is energized, the tabulating lever 110 is moved counterclockwise as viewed in Fig. 3, to withdraw the escapement pawls 53 from the escapement rack 54 and thereby effect movement of the carriage to the left. Also, the projection 120 on the lever 110 will engage the next pre-set column stop 115 which, as stated, is in column #17, and with the result that the tabulating lever 110 will be restored to the position shown in Fig. 3 and will thereby release the pawls 53 to stop the carriage. Also, at column #17 the control stop 180 will open the normally closed contacts 180a and thereby break the previously described circuit through the holding coil of relay R10 and the branch parallel circuit through the automatic tabulating solenoid 125. As contacts 179a opened after the carriage 21 passed control stop 179 in column #14, relay R10 cannot be again picked up until another control stop 179 is engaged. Contacts R10a and R10b will therefore remain open.

When R10 is energized and contacts R10b closed as above noted, the keyboard lock solenoid 162 was also energized by a circuit traceable as follows: from the wire 402, switch 195, wire 408, contacts R10b, wire 409, solenoid 162 to the return wire 403. Thus, the keyboard will be automatically locked during automatic tabulation to prevent accidental operation of the typewriter keys. When the contact 180a is opened to drop out relay R10 in the manner explained above, the contacts R10b will be opened and the keyboard lock solenoid 162 deenergized and typing may be resumed as before.

When the column #87 is reached, control stop 178 will close its contacts 178a and thereby energize the pick-up coil of relay R13 by a circuit traceable as follows: wire 402, switch 195, wire 404, contacts 178a now closed, wire 419 and the pick-up coil of R13 to return wire 403. R13 will close contacts R13a and R13b and open contacts R13c.

The closure of contacts R13a will close a holding circuit through the holding coil of R13 traceable as follows: wire 402, wire 406, normally closed contacts 193a, wire 407, contacts R13a holding coil of R13 to return wire 403.

The opening of normally closed contacts R13c breaks the holding circuit through the holding coil of relay R12 and thereby drops out this relay to open its contacts R12a and the start contacts R12b, thereby breaking the connection between the wire 411 and the positive wire 402 and preventing further concomitant operation of the typewriter and punch.

The closing of contacts R13b establishes a branch circuit from wire 407 through the holding coil of relay R11 to the return wire 403, thereby energizing again R11 and closing contacts R11a and R11b. The closure of contacts R11a will establish a holding circuit through holding coil of relay R11 as previously traced. The closure of contacts R11b will result in the energizing of the keyboard lock solenoid 162 by the circuit previously traced, thereby notifying the operator that the typewriter and punch are disconnected.

Before typing can be resumed or before the carriage return key depressed to return the carriage 21 to begin a new line of typing, the keyboard must be unlocked by depressing the manual punch control button 193 to open contacts 193a and thereby break the holding circuit of relays R11 and R13. This will also close R13c, but the punch cannot be operated by the key contacts because the circuit through relay R12 is still open at R12b and R12a.

When the carriage return key 130 is depressed in the manner previously described to return the carriage 21 to begin a new line of typing, the contact points 172 will close and points 171 will open. The closing of contacts 172 will establish a circuit through the keyboard lock solenoid 162 traceable as follows: wires 402 and 406, contacts 193a, wire 407, wire 414, contacts 172 now closed, wire 420, wire 409, solenoid 162 to the return wire 403. It is noted that the opening of contacts 171 will disconnect the positive wire 402 from the control contacts 179a and 180a. The reason for the latter is to prevent the operation of these contacts by the control stops 179 and 180 from having any effect on the circuits controlled thereby when the carriage is being returned. At the end of the carriage return movement the cam unit 33d will be returned to its normal position where contacts 171 are closed and 172 opened. This will deenergize the solenoid 162 to unlock the keyboard and connect again the contacts 179a and 180a with the positive wire 402.

As stated previously, the sets of key contacts 167 and 167c are connected to the code punch solenoids by circuit wires so that when any key is depressed to close its related set of key contacts, the punch solenoids will be selectively energized to effect the recording in a record field of the tape the code designation for the key depressed and in accordance with the combinational hole code shown in Fig. 20. In order to accomplish this result, twelve code circuit wires are provided which are numbered 430 to 439 inclusive, 441 and 442, respectively (see Figs. 23a and 23b). The twelve code circuit wires 430 to 439 inclusive, 441 and 442 are connected, respectively, to the code punch solenoids PS0 to PS9 inclusive, PS11 and PS12, and therefore correspond, respectively, to the twelve code positions 0 to 9 inclusive, 11 and 12 shown in Fig. 20.

The sets of key contacts 167 and 167c are connected to the twelve code circuit wires in accordance with the code designations corresponding to the typewriter keys controlling such sets of contacts. For example, in the case of the set 167 controlled by the typewriter key corresponding to the alphabetic character "A," one contact of such set is connected to the code circuit wire 442 and through the latter to code punch solenoid PS12, and another contact of such set is connected to the code wire 431 and through it to code punch solenoid PS1. As explained previously, the simultaneous energizing of code punch solenoids PS12 and PS1 will result in simultaneously punching code holes in code positions 12 and 1 in a record field of the tape, which as will be observed from an examination of Fig. 20, is the code designation for the alphabetic character "A."

With the exception of the set of key contacts 167 operated by the key 25 for the character "L," all of the sets of key contacts are connected directly to the proper code circuit wires to effect the recording of their respective code designations in the tape, in the manner explained above. In the embodiment disclosed, the key for character "L" is used when the type basket is in upper case to print the letter "L" and to concomitantly record the code designation therefor in the tape, and the same key is used when the type basket is in lower case position to print the numeral "1" and concomitantly therewith to record the code designation for the numeral "1." The latter is one of the principal reasons why it is preferred that alphabetic printing and concomitant recording be effected with the type basket in upper case position and numeral printing and recording is effected with the type basket in lower case.

The connection between the set of key contacts 167 and the code circuit wires to provide for recording of the "L" code designation in upper case and the numeral "1" code designation in lower case, is effected by the selector means previously described as being under the control of the basket shift means. As shown, the code circuit wire 441 is connected by a wire 422 with one of the pairs of contact points 189 and the other point of the pair 189 is connected by a wire 423 with one contact of the set of key contacts controlled by the "L" key. The code wire 433 is connected by a wire 424 with the fixed contact point 191 of the set of selector transfer contacts, and the other fixed point 190 is connected by a wire 425 with the code circuit wire 431. The movable point 192 of the selector transfer contacts is connected by a wire 426 with another contact of the set 167 controlled by the "L" key. Therefore, with the type basket in upper case position, the position shown, the set of key contacts 167 for the key "L" is connected through the selector contacts 189 and 192, 191, with the code circuit wires 441 and 433 which are connected to code punch solenoids PS11 and PS3 and correspond to code positions 11 and 3, the code designation for the character "L." When the type basket is shifted to lower case position in the manner previously described, contacts 189 open and contact point 192 is disconnected from point 191 and connected to point 190. Hence, in lower case the set of key contacts for the "L" key is connected only to the circuit wire 431 which is connected to solenoid PS1 and corresponds to code position 1, the code designation for the numeral "1."

In accordance with the present invention, provision is made for also energizing the feed punch solenoid FPS each time a set of key contacts is closed. A circuit wire 443 is provided and is connected to one side of solenoid FPS. As shown in Fig. 23a the circuit wire 443 is connected directly to each set of key contacts 167 controlled by an alphabetic key, by the "Release" key 18, by the space bar 55, and the set 167c controlled by the tabulating key 65. The circuit wire 443 is connected to the remaining sets of key contacts 167 through a wire 444 selector contacts 188 and a wire 445. As explained above, the selector contacts 188 are open when the type basket is in upper case position and closed when the type basket is in lower case position.

The foregoing describes how the key contacts 167 and 167c connect, at the will of the operator, the positive wire 402 with the code punch solenoids and with the feed punch solenoid FPS. Referring to Fig. 23b it is noted that the code punch solenoids PS1 to PS9 inclusive are connected by a common wire 446, an interlock relay R6, a wire 450, and normally closed interlock contacts R1c, R3c, and R9d with the return wire 403. The code punch solenoid PS0 is connected to the return wire 403 through a wire 451, an interlock relay R5, the wire 450, and the interlock contacts R1c, R3c and R9d. The code punch solenoids PS12 and PS11 are connected by a common wire 452 and interlock relay R4 to the wire 450, and through the latter and normally closed interlock contacts R1c, R3c and R9d with the return wire 403. The feed punch solenoid FPS is connected through a relay R7, the wire 450 and the interlock contacts R1c, R3c and R9d with the wire 403. Thus, as stated above, when the start relay contacts R12b are closed and with the type basket in proper position, each time a typewriter key is depressed, its set of key contacts is closed and the code punch solenoid, or solenoids, corresponding to the code designation for such key is energized, and also the feed punch solenoid is energized, with the result that the proper code hole, or holes, for the key depressed is punched in the tape and a feed hole is also punched in the tape.

As explained above, for alphabetic typing and code recording the type basket is shifted to upper case position and for numeral typing and code recording the type basket is shifted to lower case position. Also, the recording of the code designation "Tabulate (skip)" by the tabulating key 65 and the code designation "Space" by the space bar 55 and the recording of the code designation "Release" by the key 18 is effected by depressing the keys named when the type basket is in either position.

The "Release" key 18 may be one of the punctuation character keys of the typewriter. In the embodiment shown, the key 18 is the key customarily used in the conventional keyboard to print the comma (,) in both upper case and lower case. Herein, the type bar 38 controlled by the key 18 is not provided with either upper or lower case type. Hence, the depressing of this key with the type basket in either case will effect the spacing of the typewriter carriage and the punching of the "Release" code (12—0—6), but there will be no printing on the work sheet 23.

The functional code keys 16, 17, and 19 are also shown herein as being those which are used in conventional keyboards for punctuation characters; and, as stated above, these keys are used to record their respective functional code designations when the type basket is in lower case position. The sets of key contacts 167 controlled by these keys are indicated, respectively, in Fig. 23a by the name of the code designation corresponding thereto.

The "Error indication" key 16 is the key used in conventional keyboards for printing the slanting line (/) in lower case and the question mark (?) in the upper case. The lower case type for the slanting line is omitted from the type bar 38 controlled by this key (see Fig. 13). It is also noted that the base of this type bar is cut away as indicated at 198 so that when the type bar is actuated by its related cam unit, the universal bar 50 will not be operated to space the typewriter carriage.

The purpose of the key 16 is to provide a code designation which will serve to cancel or nullify a previously recorded code designation in the tape. For example, if an error be made in the operation of the typewriter controlled tape punch disclosed herein, the back space key 93 is depressed to space the typewriter carriage 21 backward in the manner previously described to bring the column containing the error back into printing position. At the same time, the key 93 closes its key contacts 169 to energize the back space solenoid BS and thereby space the record tape backward a distance of one recording field so as to bring the field in which the mistake was made back to recording position. The energizing circuit for solenoid BS is traced as follows: from the positive wire 402, switch 195, wire 408, contacts R12b, wire 410, wire 411, key contacts 169, wire 427, wire 428, solenoid BS to the return wire 403.

With the recording field in which the error was made in recording position, the "Error indication" key 16 is depressed with the type basket in lower case position and as a result the "Error indication" code or canceling code (12—0—2) is punched in the tape over the erroneous code previously recorded, and, the tape is spaced forward to bring the next recording field into recording position. However, the carriage 21 is not spaced. The error on the work sheet can then be erased and the correct character printed thereover with the code designation therefor being recorded in the record field following the one where the "Error indication" code was recorded. As is well known to those skilled in this art, when the prepared tape is later used to control the punching of tabulating cards, the card punching machine, upon sensing the "Error indication" code, will merely space the tape without operating the punching mechanism.

When the type basket is in upper case, the key 16 may be used to print the question mark (?), but the carriage 21 will have to be manually spaced, because, as explained above, no provision is made for spacing the carriage automatically by the type bar.

The "Tabulate (skip)" key 17 is the key used in conventional keyboards to print the apostrophe (') in lower case and the quotation marks (") in upper case. With the type basket in lower case, depression of this key causes the printing of the "Tabulate (skip)" code (12—0—4). The typewriter carriage will be spaced but there will be no printing as the lower case type is not provided on the bar controlled by the key 17. In upper case, the quotation marks (") are printed, the carriage is spaced, but no punching of the tape occurs.

The "Error eject" key 18 is the key used in conventional keyboards for printing the semicolon (;) in lower case position, and the colon (:) in upper case position. The type for the semicolon is eliminated from the type bar 36 for this key. Thus, when in lower case position, the "Error eject" code (12—0—9) is punched, there is no printing by the type bar and the carriage is spaced. With the type basket in upper case the depressing of this key prints the colon (:) and the carriage is spaced, but no code designation is recorded.

The key 14 which is used to record the control code hole in the code position 11, is the one used in conventional keyboards for printing the (-) in lower case position and the underscore (_) in upper case position. Herein the type bar controlled by the key 14 is not provided with lower case type. Hence, with the type basket in lower case position the depressing of this key will result in the punching of a code hole in code position 11, there will be no printing by the type bar, and the carriage 21 will be spaced. In the upper case position the depressing of this key will print the underscore (_) character and the carriage will be spaced, but there will be no punching of the tape.

The key 15 which is used for recording a code hole in code position 12, is the one customarily used for printing the character one-half (½) in lower case and the character one-quarter (¼) in upper case. No lower case type is provided on the type bar controlled by this key. Therefore, when the type basket is in lower case position, the depressing of this key results in the punching of a code hole in code position 12, the typewriter carriage is spaced, but no printing is effected on the work sheet 23. With the type basket in upper case position, the depressing of this key will print the character one-quarter (¼) and the carriage will be spaced, but the tape will not be punched.

As stated hereinabove, the improved control means provides for a definite cycle of operation initiated each time a typewriter key is depressed which cycle comprises three steps occurring in a definite sequence. These steps were stated to be, first, the energizing of the punch solenoids, to punch code holes and a feed hole in the tape, second, the restoring of the punches to their normal or inactive positions and third, the energizing of the tape feed solenoid TFS to effect feeding of the tape. The control means was also described as including interlock means which operates to assure the completion of each of the operating steps before the next succeeding step is performed and for the completion of all of the steps of a cycle before a second cycle can be initiated by the depressing of a typewriter key.

A complete cycle of operation is as follows: when any of the typewriter keys is depressed, for example, the key 25 for the alphabetic character "A," its set of key contacts 167 will be closed by its cam unit and thereby connect the hot wire 411 with the code circuit wires 442 and 431 respectively and with the circuit wire 443. As explained above, these circuit wires are connected respectively to the punch solenoids PS12 and PS1 and the feed punch solenoid FPS. This will result in the energizing of these punch solenoids to punch corresponding holes in the tape, and in the energizing of interlock relays R4 and R6 and R7.

Energized relay R4 opens its interlock contacts R4a and relay R6 opens its contacts R6a, and each of these open contacts prevents the closing of an energizing circuit for knock-off control relay R1 until its related punch has completed its respective punching strokes. Energized relay R7 opens its contacts R7a and thereby drops out the holding circuit for a relay R2. Contacts R2a will then occupy the open position shown, and contacts R2b, R2c, and R2d their respective closed positions which are shown.

As explained hereinabove, when the code punch CP12 passes through the tape and thereby completes its punching stroke, the arm 245 of its operating rocker 222 closes interlock contacts 248 which as shown in Fig. 23b establishes a by-pass circuit path around the now open interlock relay contacts R4a. When the code punch CP1 passes through the tape and completes its punching stroke its related rocker 222 engages the ball 225 and causes the arm 244 thereof to close the interlock ball contacts 240 which as shown in Fig. 23b establishes a by-pass circuit path around the now open interlock relay contacts R6a. When the feed punch FP passes through the tape and completes its stroke, the arm 253 on its rocker 222 closes interlock feed contacts 255. It is noted that as interlock relay R5 was not energized when the key for character "A" was depressed, its contacts R5a remain closed.

The closure of contacts 255, 240 and 248 establishes the energizing circuit for knock-off control relay R1 traceable as follows: from the positive wire 402, closed switch 195, wire 408, now closed contacts 255, now closed contacts 240, normally closed contacts R5a, now closed contacts 248, knock-off control relay R1 to return wire 403.

From the foregoing it is apparent that in the example described the interlock relays R4 and R6, with their contacts R4a and R6a, and the interlock punch operated contacts 248, 240 and 255, provide effectively for the completion of the punching step before the next step in the cycle of operation can begin, the next step beginning with the energizing of knock-off control relay R1. It will also be apparent that when the code designation for the key depressed includes a hole in the 0 code position, the interlock relay R5 and its contacts R5a and the contacts 251 which close a by-pass circuit path around contacts R5a upon the completion of the punching stroke of code punch CP0, will also perform this same function of delaying the energizing of relay R1.

When the knock-off relay R1 is energized, its contacts R1a and R1b are closed and its contacts R1c are opened. With the relay contacts R2c closed as explained above, and with the closing of R1a, a circuit is established through the holding coil of relay R1 which is traceable as follows: from the positive wire 402, switch 195, wire 408, closed contacts R2c, wire 460, now closed contacts R1a, wire 461, the holding coil of relay R1 to the return wire 403. At the same time, a branch parallel circuit is established from wire 461 through the knock-off solenoid KS which is traceable as follows: from the wire 461, through normally closed relay contacts R3b, the contacts R2d, and the knock-off solenoid KS to the return wire 403.

When contacts R1c are opened upon the energization of relay R1, the energizing circuits through the code punch solenoids PS12 and PS1 and the feed punch solenoid FPS are broken. Consequently, circuits through the punch solenoids cannot be reestablished until R1c closes, which, as will presently appear, does not occur until the end of the cycle. This prevents the initiating of a second cycle of operation before a first cycle is completed.

When the knock-off solenoid KS is energized, the knock-off bail 267 is operated in the manner previously explained to restore all of the code punches to their normal or inactive positions. At the end of the restoring movement, the arm 278 of the knock-off bail closes its contacts 279 and thereby establishes a circuit through the pick-up coil of the paper feed control relay R3 which is traced as follows: from the positive wire 402, through switch 195, wire 408, wire 463, contacts 279 now closed, wire 464, pick-up coil of relay R3 to the return wire 403. Relay R3, when energized, closes its contacts R3a and opens its contacts R3b and R3c.

The closure of relay contacts R3a establishes a holding circuit through the holding coil of R3 which is traced as follows: positive wire 402, switch 195, wire 408, closed contacts R2c, now closed contacts R3a, wire 465, holding coil of R3 to return wire 403. The closure of contacts R3a also establishes a branch parallel circuit from wire 465 through the tape feed solenoid TFS traceable as follows: from wire 465, closed contacts R2b, solenoid TFS to the return wire 403. The opening of relay contacts R3b opens the circuit through the knock-off solenoid KS and the knock-off bail is returned to its normal or inactive position by means of the spring force inherent in the movable spring blade of the knock-off contacts 279.

The opening of contacts R3c serves to break at another point the energizing circuit through the punch solenoids and thereby prevents the reenergizing of this circuit by the depressing of a typewriter key until after the relay R3 is de-energized. One of the principal advantages of the contacts R3c is to prevent the reenergizing of any of the punch solenoid circuits should the armature of the knock-off solenoid KS become stuck and prevent the contacts 279 from opening. In such a case, the pick-up coil of relay R3 remains energized and the contacts R3c therefore remain open and prevent the energizing of any of the punch solenoids.

As described above, when the tape feed solenoid TFS is energized, the arm 289 on the tape feed shaft 281 is moved clockwise, as viewed in Fig. 19, and the feed pawl 287 engages the ratchet wheel 286 to move the tape feed drum 280 clockwise and thereby advance or space the tape the distance of one recording field. As the arm 287 completes the just described feeding movement, it engages the movable blade 321 of its set of transfer contacts 320, and moves the blade to open the contact points 322 and close the contact points 323. The closing of contact points 323 establishes a circuit through the pick-up coil of relay R2 which is traced as follows: from the positive wire 402, switch 195, wire 408, wire 467, contact points 323 now closed, wire 468, pick-up coil of R2 to return wire 403. When relay R2 is energized it closes its contacts R2a and opens its contacts R2b, R2c and R2d.

As relay R7 was dropped out with the opening of interlock contacts R1c and its contacts R7a closed, the closure of contact R2a establishes a holding circuit through the holding coil of relay R2 which is traced as follows: from the positive wire 402, switch 195, wire 408, wire 467, now closed contacts R7a, now closed contacts R2a, holding coil of R2 to the return wire 403. The opening of contacts R2c opens the holding circuit of relays R1 and R3 and also deenergizes the tape feed solenoid TFS. The opening of contacts R2b also breaks the circuit path through solenoid TFS. The opening of contacts R2c and R2d also breaks at two points the circuit path through knock-off solenoid KS.

In addition to breaking circuits through relays R1 and R3 and through solenoids TFS and KS for the purpose of ending a cycle of operation; relay R2 through its contacts R2b, R2c, and R2d, assures at the beginning of a cycle, in cooperation with relay R7 and its contacts R7a, that the energizing circuit for the feed punch solenoid FPS is first established before the holding circuit for knock-off control relay R1 can be established and before the remaining steps of the cycle of operation can be effected.

When the feed punch solenoid FPS was energized in response to the depressing of the key for the letter "A" a branch parallel circuit was also established from the wire 443 to pick up a punch hold relay R8, which is traced as follows: from wire 443, a wire 469, normally closed contacts R9b, picked-up coil of R8 to return wire 403. When R8 is energized its contacts R8a, R8b, and R8b are closed. The closure of contacts R8a establishes a holding circuit from wire 469 through normally closed contacts R1b, now closed contacts R8a, wire 470, and the holding coil of R8 to the return wire 403. The closure of contacts R8b establishes a circuit path from the wire 469 through the pick-up coil of interlock relay R9 to the return wire 403. The closure of contacts R8c establishes a by-pass circuit path around the interlock contacts R9d in the energizing circuits for the punch solenoids.

When relay R9 is thus energized it closes its contacts R9a, and R9c and opens its contacts R9b and R9d. Closure of contacts R9a establishes a holding circuit through the holding coil of relay R9 which is traced as follows: from the positive wire 402, switch 195, wire 408, wire 467, normally closed contact points 322, wire 471, now closed contacts R9a, wire 472, holding coil of relay R9 to return wire 403. The opening of contacts R9b drops out the pickup coil of relay R8. The closing of contacts R9c establishes a circuit through the keyboard lock solenoid 162 which can be traced as follows: from the positive wire 402, switch 195, wire 408, a wire 473, contacts R9c now closed, wire 409, solenoid 162 to return wire 403. The energizing of solenoid 162 serves to lock the keyboard in the manner explained hereinabove. The opening of contacts R9d breaks the energizing circuit path for the punch solenoids at another point; but it is noted that as long as relay R8 is energized and its contacts R8c closed, the open contacts R9d are by-passed.

Relay R8 is deenergized with the opening of contacts R1b by the energizing of relay R1, or with the reopening of the set of key contacts 167 or 167c by their related cam unit, whichever occurs first. R9 remains energized until the completion of the cycle of operation when the set of transfer contacts 320 are operated to open contact points 322 and thereby open the holding circuit for R9. Therefore, when relay R8 is deenergized and opens its contacts R8c, the energizing circuit path through the punch solenoids is broken by the open contacts R9d and cannot be again reestablished until the end of the cycle. The purpose of relay R9 is to prevent the punch solenoids from being reenergized in a case where one, or more, of the punches fails to complete its stroke and thereby establish an energizing circuit path through the knock-off control relay R1. Relay R8 and its contacts R8c holds closed the by-pass circuit path around contacts R9d until the end of the impulse through the set of key contacts. If by this time relay R1 has not been energized, open contacts R9d will prevent further energizing of the punch solenoids until the cycle has been completed or, in the case of a punch failure, until the failure is corrected. The contacts R9c which lock the keyboard, provide an additional means for preventing the initiating of a second cycle of operation until the first cycle is completed and R9 deenergized.

When it is desired only to feed out the tape without code punching or typing, the button 207 on the punch is depressed to close its contacts 207a. This will energize the tape feed solenoid FPS by a circuit traced as follows: from the positive wire 402, switch 195, wire 408, a wire 480, contacts 207a, solenoid FPS, relay R7, wire 450, and through interlock relay contacts R1c, R3c, and R9d to the return wire 403. The resulting cycle of operation will be apparent from the above described cycle of operation initiated by a typewriter key. As long as the button 207 is held depressed, a succession of feed holes will be punched in the tape and the tape fed out by the solenoid TFS.

The purposes and use of the present invention can be further understood by following the various operations which take place during the preparation of a sample invoice on the typewriter and the concomitant recording of the code designations for the elements of the invoice in a record tape. Fig. 21 shows a portion of such a sample invoice and Fig. 22 a portion of a record tape prepared concomitantly with the typing of the invoice. In the preparing of this invoice and record tape the control stops 177, 178, 179 and 180 are placed in the columns as shown in Fig. 3 and as described hereinabove. Also, the column stops 115 are set in columns #17, #23, #57, #69, and #80, respectively, as shown in Fig. 3. The left-hand margin stop (not shown) for the typewriter may be set for column #12, and the right hand margin stop (not shown) may be set beyond column #88.

The typewriter control switch 32 is placed in the on or closed position, but the tape punch control switch 195 is left in the off or open position. The heading for the invoice, "Xyz anywhere U. S. A.," is then typed. There is no punching of the tape while the heading is typed as the switch 195 is open.

The carriage 21 is then moved to column #12 and the platen rotated to bring the proper line into printing position to begin the typing of the first item of the invoice. The punch control switch 195 is then turned to the on or closed position. As the carriage is in column #12, control stop 177 has closed its contacts 177a and relays R11 and R12 will be picked up and will thereby lock the keyboard and close contacts R12b to connect the positive wire 402 with the sets of key contacts. The keyboard is then unlocked by depressing the manual punch control button 193. The type basket is in its normal lower case position.

The first line of the invoice is typed as follows: the space bar 55 is depressed, then the key for the numeral "4." As the carriage 21 escapes from column #13 where the "4" is typed, the automobile tabulating control stop 179 closes contacts 179a and energizes the tabulating solenoid 125 and thereby causes the carriage to skip to column #17 where the column stop 115 stops the carriage and the control stop 180 breaks the circuit to the solenoid 125.

The shift lock key 70 is depressed to shift and hold the type basket in upper case position. "D," "O" and "Z" are typed in columns #17, #18, and #19. As the carriage escapes to column #20, the control stops 179 energize tab solenoid 125 and the carriage skips to column #23 where it is stopped by a column stop 115 and the solenoid 125 deenergized.

"Tow ropes" is typed, the space bar depressed once, the shift key 68 depressed to release the shift key lever and return the type basket to lower case. "12" is then typed, the space bar depressed, the shift lock key 70 again depressed and "FT" typed.

The tabulating key 65 is depressed which causes the carriage to skip to column #57 where a column stop 115 has been set. "B" is typed in column #57, the space bar depressed, and the shift key depressed to return the type basket to lower case. The numerals "6," "0," and "6" are then typed. As the carriage escapes to column #62, the control stop 179 therein energizes the solenoid 125 and the carriage automatically tabulates to column #69 where the carriage is stopped by a pre-set column stop 115 and the solenoid 125 deenergized.

The numerals "3," "1," and "0" are then typed in columns #69, #70, and #71. Another control stop 179 energizes the solenoid 125 and the carriage skips to column #80 where the solenoid 125 is deenergized and the carriage stopped by a stop 115.

The space bar is depressed and the numerals "1," "2," "4," and "0" typed in columns #81 to 84 inclusive. The release key 18 is depressed. The carriage return key 130 is depressed and the carriage is returned to the left-hand margin stop (not shown), which is accompanied by the usual line spacing operation of the platen. If the left-hand margin stop has been placed in column #12, the carriage will be in position to type the next line of the invoice. The manual punch control button 193 would then be depressed to unlock the keyboard and the typing of the second line effected in the same manner as the first.

It is noted that a control stop 178 is shown as placed in column #87. The latter is used where it is desired to automatically disconnect the typewriter from the punch so that typing can be effected in subsequent columns without operating the punch. In the example described, there is no typing beyond column #84, so the function of control stop 178 was not included. However, if instead of depressing the carriage return key 130 in column #85, the space bar had been depressed twice, the stop 178 would close its contacts 178a and thereby pick up R13 and open R13c to break the holding circuit for R12. This would open start contacts R12b and the circuit path to the sets of key contacts. The keyboard would also be locked as R11 is picked up by R13b. The punch control button 193 is then depressed to unlock the keyboard, and then typing without punching can be effected in columns beyond #87. The carriage return key 130 will then be depressed to return the carriage to columns #12 where stop 177 picks up relay R12 and closes R12b to connect again the typewriter and punch.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for recording data on a record strip comprising a recording element; recording control means providing a recording movement of said element from a normal or inactive position into recording engagement with said strip; means providing for the restoring of said element to said inactive position; and interlock means effective upon the initiation of a recording movement by the operation of said recording control means, to prevent operation of said restoring means, and effective upon the completion of such recording movement, to provide for the operation of said restoring means.

2. Apparatus for recording data on a record strip comprising means including a recording element movable from an inactive position into recording engagement with said strip; a first circuit including a circuit closing means, a first electrically responsive device operable when energized to effect a recording movement of said recording element, and a second electrically responsive device; a second circuit including a third electrically responsive device operable when energized to provide for restoring said recording element to inactive position, and also including a pair of normally closed contacts movable to open position in response to the energizing of said second electrically responsive device, and a pair of normally open contacts connected in parallel with said normally closed contacts; and means operable upon a completion of a recording movement of said element for closing said normally open contacts.

3. Apparatus for recording data on a record strip comprising a recording element; recording means operable to provide a recording movement of said element from an inactive position into recording engagement with said strip; control means operable for a definite period for effecting operation of said recording means; means providing for the restoring of said element to said inactive position at the completion of said recording movement; and interlock means effective from the end of said definite period until after the completion of the restoring movement of said element, for disabling said control means and thereby assuring the completion of one recording operation before a second operation can be initiated.

4. Apparatus for recording data on a record strip comprising means including a recording element movable from an inactive position into recording engagement with said strip; a circuit including an electrically responsive device operable when energized to effect a recording movement of said recording element, means operable to close said circuit for a definite period normally long enough to effect said recording movement and operable then to open said circuit, and interlock contacts operable to provide for current flow therethrough during said definite period; means operable upon a completion of a recording movement of said element for restoring the latter to inactive position; and means effective at the end of said definite period for operating said interlock contacts to open and hold open said first circuit until after said recording element has been restored to inactive position.

5. Apparatus for recording data on a record strip comprising a recording element; recording control means effective for a definite period for providing a recording movement of said element from an inactive position into recording engagement with said strip; means providing for the restoring of said element to said inactive position; a first interlock means operable upon the initiation of a recording movement by the operation of said recording control means for preventing operation of said restoring means and operable upon the completion of such recording movement to provide for the operation of said restoring means; and a second interlock means effective from the end of said definite period until after the completion of the restoring movement of said element, for disabling said recording control means and thereby assuring the completion of one recording operation before a second operation can be initiated.

6. Apparatus for recording data on a record strip comprising means including a recording element movable from an inactive position into recording engagement with said strip; a first circuit including a first electrically responsive device operable when energized to effect a recording movement of said recording element, a second electrically responsive device, means operable to close said circuit for a definite period normally long enough to effect said recording movement and operable then to open said first circuit, and interlock contacts providing current flow therethrough during said definite period; a second circuit including a third electrically responsive device operable when energized to provide for restoring said recording element to inactive position, and also including a pair of normally closed contacts movable to open position in response to the energizing of said second electrically responsive device, and a pair of normally open contacts connected in parallel with said normally closed contacts; means operable upon a completion of a recording movement of said element for closing said normally open contacts; and means effective at the end of said definite period, for operating said interlock contacts to open and hold open said first circuit until after said element has been restored to inactive position.

7. Apparatus for recording data on a record strip comprising means including a recording element movable from an inactive position into recording engagement with said strip; a first circuit including a circuit closing means, a first electrically responsive device operable when energized to effect a recording movement of said recording element, and a second electrically responsive device; a second circuit including a third electrically responsive device operable when energized to provide for restoring said recording element to inactive position, and also including a pair of normally closed contacts movable to open position in response to the energizing of said second electrically responsive device, and a pair of normally open contacts connected in parallel with said normally closed contacts; means operable upon a completion of a recording movement of said element for closing said normally open contacts; and means operable upon a completion of the restoring movement of said recording element for spacing said record strip to bring a blank recording field thereon into recording position.

8. Apparatus for recording data on a record strip comprising a code recorder including a code hole punch and a feed hole punch; recording control means providing for the movement of both said punches from inactive positions into punching engagement with said strip; means providing for the restoring of both elements to their inactive positions; means operable in response to the initiation of a punching operation of the code punch for preventing operation of said restoring means; means operable upon a completion of a punching movement of said code punch for rendering said last-named means ineffective; and means normally effective to prevent operation of said restoring means and being rendered ineffective in response to the completion of a punching stroke by said feed hole punch.

9. Apparatus for recording data on a record strip comprising a code recorder including a code hole punch and a feed hole punch operable, respectively, to move from inactive positions into punching engagement with said strip; a first circuit including a circuit closing means, first and second electrically responsive devices connected in parallel, and a third electrically responsive device connected in series with said first device and with said circuit closing means; said first electrically responsive device being operable when energized to effect a punching movement of said code punch and said second device being operable when energized to effect a puching movement of said feed hole punch; a second circuit including a fourth electrically responsive device operable when energized to provide for restoring said punches to inactive position, a pair of normally closed contacts movable to open position in response to the energizing of said third device, a first pair of normally open contact connected in parallel with said normally closed contacts, and a second pair of normally open contacts connected in series with said normally closed contacts and said first normally open contacts; means operable upon completion of a punching movement of said code punch for closing said first normally open contacts; and means operable upon the completion of a punching movement of said feed hole punch for closing said second normally open contacts.

10. Cyclically operable apparatus for recording data on a record strip comprising recording means including a recording element and means for moving said recording element from an inactive position into recording engagement with said strip; restoring means operable to return said element to its inactive position; strip feeding means operable to space said strip to bring a new recording field thereof into recording position; and control means providing a cycle of operation weherin said recording element is moved into recording engagement with said strip, said element is returned to inactive position, and said strip is spaced, and said control means including means operable upon the completion of a recording movement of said element to render said restoring means effective, and interlock means operable upon the operation of said last-named means for preventing the initiation of another cycle of operation before the first cycle is completed.

11. In apparatus for recording data on a record strip, a recorder including a recording element; recording means for moving said element from an inactive position into recording engagement with said strip; restoring means for returning said element to inactive position; strip feeding means for spacing the strip to bring a new recording field thereon into recording position; and control means providing a cycle of operation wherein said recording means, said restoring means and said strip feeding means are sequentially operated in the order named, and said control means comprising means for initiating a cycle of operation, a first interlock means rendered effective upon the initiation of a cycle to prevent operation of said restoring means and rendered ineffective in response to the completion of the recording movement of said element, a second interlock means rendered effective with the operation of the restoring means to prevent the initiation of another cycle of operation, means effective upon a completion of the restoring operation for initiating the operation of the strip feeding means, and means effective upon a completion of the spacing of the strip for rendering said second interlock means ineffective.

12. In apparatus for recording data on a record strip, a recorder including a recording element; recording means for moving said element from an inactive position into recording engagement with said strip; restoring means for returning said element to inactive position; strip feeding means for spacing the strip to bring a new recording field thereon into recording position; and control means providing a cycle of operation wherein said recording means, said restoring means and said strip feeding means are requentially operated in the order named, and said control means comprising means for initiating a cycle of operation and providing for the operation of said recording means within a definite period of time, a first interlock means rendered effective upon the initiation of a cycle to prevent operation of said restoring means and rendered ineffective in response to the completion of the recording movement of said element, a second interlock means effective at the termination of said definite period to prevent the initiation of a second cycle, means effective at the end of the restoring operation for initiating the operation of said strip feeding means, and means effective at the end of the operation of said strip feeding means for rendering the second interlock means ineffective so as to permit the initiation of a second cycle of operation.

13. In apparatus for recording data on a record strip, a recorder including a recording element; recording means for moving said element from an inactive position into recording engagement with said strip; restoring means for returning said element to inactive position; strip feeding means for spacing the strip to bring a new recording field thereon into recording position; and control means providing a cycle of operation wherein said recording means, said restoring means and said strip feeding means are sequentially operated in the order named, and said control means comprising means for initiating a cycle of operaiton and providing for the operation of said recording means within a definite period of time, a first interlock means rendered effective upon the initiation of a cycle to prevent operation of said restoring means and rendered ineffective in response to the completion of the recording movement of said element, a second interlock means effective at the termination of said definite period to prevent the initiation of a second cycle, a third interlock means rendered effective with the operation of the restoring means to prevent the initiation of a second cycle, means effective at the end of the restoring operation for initiating the operation of said strip feeding means, and means effective at the end of the operation of said strip feeding means for rendering said second interlock means and said third interlock means ineffective so as to permit the initiation of a second cycle of operation.

14. Apparatus for recording data on a record strip as code designations of the component characters of the data in accordance with a selected code having a plurality of code positions, and comprising means for feeding the strip to bring successive recording fields thereof to a recording position; a plurality of recording elements corresponding in number to the positions of the code and movable, respectively, from inactive positions into recording engagement with the strip at recording position; a plurality of character keys; means responsive to the actuation of the keys for selectively effecting recording movement of the recording elements corresponding to the keys actuated so as to record in the strip the code designation for each key actuated; means providing for the restoring of the recording elements to inactive position; and interlock means effective upon the initiation of a recording operation by the actuation of a key, to prevent operation of said restoring means, and effective upon a completion of the recording movement of the recording elements, to provide for the operation of the restoring means.

15. Apparatus for recording data on a record strip as code designations of the component characters of the data and in accordance with a selected code having a plurality of code positions, and comprising means for feeding the strip to bring successive recording fields thereon to a recording position; a plurality of recording elements corresponding in number to the positions of the code and movable, respectively, from inactive positions into recording engagement with the strip at recording position; a plurality of character keys; means responsive to the actuation of the keys for selectively effecting recording movement of the recording elements corresponding to the keys actuated so as to record in the strip the code designation of each key actuated; an electrical circuit including an electrically responsive device operable when energized to provide for restoring the recording elements which have been actuated to their inactive positions, and said circuit also including a pair of normally closed contacts movable to open position in response to the actuation of any of said keys and a pair of normally open contacts connected in parallel with said normally closed contacts; and a bail device operable upon the movement of the recording elements into recording engagement with said strip to close said pair of normally open contacts.

16. Apparatus for recording data on a record strip as code designations of the component characters of the data and in accordance with a selected code having a plurality of code positions, and comprising strip feeding means operable to space the strip to bring successive recording fields thereof into recording position; a plurality of code recording elements corresponding in number to the positions of the code and movable, respectively, from inactive positions into recording engagement with the strip at said recording position; a plurality of character keys; recording means operable in response to the actuation of the keys for selectively effecting recording movement of the recording elements corresponding to the keys actuated so as to record in the strip the code designation of each key actuated and said recording means being effective in its operation for a definite period after the initiation of its operation by the actuation of a key; means operable upon the completion of a recording movement, for restoring the recording elements to inactive position; and interlock means effective at the end of said definite period for preventing a second operation of said recording means and effective upon the releasing of the key actuated for locking the keys to prevent their being actuated again; and means operable after the completion of the operation of the restoring means for rendering said interlock means ineffective.

17. Apparatus for concomitantly printing characters on a work sheet and recording on a record strip code designations thereof according to a selected code, and comprising a typewriter including a carriage carrying a platen adapted to support a work sheet, type members carrying, respectively, upper and lower case type, a plurality of keys operable, respectively, to actuate the type members, and case shifting mechanism adjustable to provide for selectively printing upper and lower case characters upon depression of said keys; a code recorder including a plurality of recording elements movable into recording engagement with a record strip; and control means acting in response to the depression of said keys to effect movement of said recording elements to record in said strip code designations corresponding, respectively, to the characters printed, and said control means including selector mechanism adjustable in response to the adjusting of said case shifting mechanism to provide in response to the depression of one of said keys, for the recording of one selected code designation when the upper case character is printed, and for the recording of another selected code designation when the lower case character is printed.

18. Apparatus for concomitantly printing characters on a work sheet and recording code designations thereof on a record strip, comprising a typewriter including a carriage having a platen mounted thereon adapted to support a work sheet, and a keyboard including character and functional keys operable when depressed to effect character printing on the work sheet and to control the functional operations of the typewriter; a code recorder including recording elements selectively movable into recording engagement with the record strip; control means acting in response to the depression of the keys to effect movement of said recording elements to record in said strip code designations corresponding, respectively, to the keys depressed; and means operable in response to the typewriter carriage reaching a selected letter space position for rendering said control means effective.

19. Apparatus for concomitantly printing characters on a work sheet and recording code designations thereof on a record strip, comprising a typewriter including a carriage having a platen mounted thereon adapted to support a work sheet, and a keyboard including character and functional keys operable when depressed to effect character printing on the work sheet and to control the functional operations of the typewriter; a code recorder including recording elements selectively movable into recording engagement with the record strip; control means acting in response to the depression of the keys to effect movement of said recording elements to record in said strip code designations corresponding, respectively, to the keys depressed; means operable in response to the typewriter carriage reaching a selected letter space position for rendering said control means effective; and means operable in response to the carriage reaching another selected letter space position for rendering said control means ineffective.

20. Apparatus for concomitantly printing characters on a work sheet and recording code designations thereof on a record strip, comprising a typewriter including a carriage having a platen mounted thereon adapted to support a work sheet, and a keyboard including character and functional keys operable when depressed to effect character printing on the work sheet and to control the functional operations of the typewriter; a code recorder including recording elements selectively movable into recording engagement with the record strip; control means acting in response to the depression of the keys to effect movement of said recording elements to record in said strip code designations corresponding, respectively, to the keys depressed; said control means comprising an electrical circuit means including key contacts closed by the depression of the keys and a pair of start contacts for connecting one side of a source of electricity with said key contacts; a second circuit including an electrically responsive device operable when energized for closing said start contacts and including a third pair of contacts; and means responsive to the typewriter carriage reaching a selected letter space position for closing said third pair of contacts and thereby closing said second circuit.

21. Apparatus for concomitantly printing characters on a work sheet and recording code designations thereof on a record strip, comprising a typewriter including a carriage having a platen mounted thereon adapted to support a work sheet, and a keyboard including character and functional keys operable when depressed to effect character printing on the work sheet and to control the functional operations of the typewriter; a code recorder including recording elements selectively movable into recording engagement with the record strip; control means acting in response to the depression of the keys to effect movement of said recording elements to record in said strip code designations corresponding, respectively, to the keys depressed; means operable in response to the typewriter carriage reaching a selected letter space position for rendering said control means effective and for locking said keys to prevent their being operated; and manualy operated means for releasing said keys without disturbing the condition of said control means so as to provide for the concomitant operation of the typewriter and the recorder.

22. Apparatus for concomitantly printing characters on a work sheet and recording code designations thereof on a record strip, comprising a typewriter including a carriage having a platen mounted thereon adapted to support a work sheet, and a keyboard including character and functional keys operable when depressed to effect character printing on the work sheet and to control the functional operations of the typewriter; a code recorder including recording elements selectively movable into recording engagement with the record strip; control means acting in response to the depression of the keys to effect movement of said recording elements to record in said strip code designations corresponding, respectively, to the keys depressed; and means operable in response to the typewriter carriage reaching a selected letter space position for disabling said control means and for locking said keys to prevent their being operated.

23. Apparatus for concomitantly printing characters on a work sheet and recording code designations thereof on a record strip, comprising a typewriter including a carriage having a platen mounted thereon adapted to support a work sheet, and a keyboard including cnaracter and functional keys operable when depressed to effect character printing on the work sheet and to control the functional operations of the typewriter; a code recorder including recording elements selectively movable into recording engagement with the record strip; control means acting in response to the depression of the keys to effect movement of said recording elements to record in said strip code designations corresponding, respectively, to the keys depressed; means operable in response to the typewriter carriage reaching a selected letter space position for rendering said control means effective and for locking said keys to prevent their being operated; means operable in response to the typewriter carriage reaching a second selected letter space position for rendering said control means ineffective and for locking said keys to prevent their being operated; and manually operated means for unlocking said keys at the will of the operator and without disturbing the condition of said control means.

24. Apparatus for concomitantly printing characters on a work sheet and recording code designations thereof on a record strip, and comprising a typewriter including a carriage having a platen mounted thereon adapted to support a work sheet, and a keyboard including character and functional keys operable when depressed to effect printing of corresponding characters on the work sheet and to control the functional operations of the typewriter; a code recorder including recording elements selectively movable into recording engagement with the record strip; control means acting in response to the depression of the keys to effect movement of said recording elements to record in said strip code designations corresponding, respectively, to the keys depressed; means responsive to the carriage moving to a first selected letter space position for automatically tabulating the carriage to a second selected letter space position; and means operable concurrently with the operation of the last named means for locking the keyboard to prevent depressing of the keys during the automatic tabulating movement.

25. Apparatus for concomitantly printing characters on a work sheet and recording code designations thereof on a record strip, and comprising a typewriter including a carriage having a platen mounted thereon adapted to supoprt a work sheet, and a keyboard including character and functional keys operable when depressed to effect printing of corresponding characters on the work sheet and to control the functional operations of the typewriter; a code recorder including recording elements selectively movable into recording engagement with the record strip; control means acting in response to the depression of the keys to effect movement of said recording elements to record in said strip code designations corresponding, respectively, to the keys depressed; means responsive to the carriage moving to a first selected letter space position for automatically tabulating the carriage to a second selected letter space position; and means operable in response to the movement of the carriage to said first letter space position for locking the keyboard to prevent depression of the keys and operable in response to said carriage reaching said second letter space position for unlocking said keyboard and thereby permitting the normal operation of the keys.

26. Apparatus for concomitantly printing characters on a work sheet and recording code designations thereof on a record strip, and comprising a typewriter including a carriage having a platen mounted thereon adapted to support a work sheet, and a keyboard including character and functional keys operable when depressed to effect printing of corresponding characters on the work sheet and to control the functional operations of the typewriter; a code recorder including recording elements selectively movable into recording engagement with the record strip; control means acting in response to the depression of the keys to effect movement of said recording elements to record in said strip code designations corresponding, respectively, to the keys depressed; means responsive to the carriage moving to a first selected letter space position for automatically tabulating the carriage to a second selected letter space position; means responsive to the depression of one of said functional keys to effect return of said carriage to begin a new line of typing; and means operable simultaneously with the depression of said one functional key for disabling said automatic tabulating means during carriage return.

ALBERT W. MILLS.
FRANK J. FURMAN.
EDWARD J. RABENDA.